United States Patent [19]
Nicoloff, Jr. et al.

[11] Patent Number: 6,017,113
[45] Date of Patent: Jan. 25, 2000

[54] MIXED-DENSITY PRINT MASKING IN A MIXED-SWATH-HEIGHT PRINTER

[75] Inventors: Nicholas Nicoloff, Jr., La Mesa, Calif.; John M. Skene, Lake Oswego, Oreg.; Joseph H. Bauman, Brush Prairie, Wash.; Donald G. Harris, Escondido; Majid Azmoon, Poway, both of Calif.

[73] Assignee: Hewlett-Packard Company, Palo Alto, Calif.

[21] Appl. No.: 08/968,867

[22] Filed: Nov. 5, 1997

Related U.S. Application Data

[63] Continuation of application No. 08/400,056, Mar. 6, 1995, abandoned, which is a continuation-in-part of application No. 08/145,261, Oct. 29, 1993, Pat. No. 5,949,453.

[51] Int. Cl.[7] ..................................................... B41J 2/145
[52] U.S. Cl. ............................................................. 347/40
[58] Field of Search ................................ 347/40, 43, 37, 347/15

[56] References Cited

U.S. PATENT DOCUMENTS

| | | | |
|---|---|---|---|
| 4,631,548 | 12/1986 | Milbrandt | 347/43 |
| 4,750,009 | 6/1988 | Yoshimura | 347/43 |
| 4,959,659 | 9/1990 | Sasaki et al. | 347/43 |
| 4,999,646 | 3/1991 | Trask | 347/43 X |
| 5,025,271 | 6/1991 | Baker et al. | 347/87 |
| 5,376,958 | 12/1994 | Richtsmeier et al. | 347/40 |
| 5,412,410 | 5/1995 | Rezanka | 347/40 |
| 5,455,610 | 10/1995 | Harrington | 347/43 |
| 5,512,923 | 4/1996 | Bauman | 347/43 X |
| 5,684,517 | 11/1997 | Clemente et al. | 347/43 |

FOREIGN PATENT DOCUMENTS

| | | | |
|---|---|---|---|
| 1216852 | 8/1989 | Japan | 347/40 |

*Primary Examiner*—N. Le
*Assistant Examiner*—Judy Nguyen

[57] ABSTRACT

At least two different pixel densities are used for different printing devices—such as inkjet pens—that operate concurrently, or different printing steps that proceed concurrently, to produce respective image swaths in a single, pixel-based printing machine. The different print devices or steps produce image swaths of respective different swath heights. In one form of the invention, the taller-swath-height printing device operates at lower pixel density, spreading its colorant over a greater area while printing-medium advance keeps pace with operation of the shallower-swath-height printing device. This procedure allows more drying and penetrating time for the colorant applied by the taller-swath device, thereby improving print attributes such as bleed, offset, cockle, curl, overall drying time and throughput. In another form of the invention the taller-swath device operates at higher pixel density, providing physical and temporal separation of colorant application from the two printing devices—to avoid adverse interfering effects between reactive inks.

20 Claims, 21 Drawing Sheets

MIXED-DENSITY PRINT MASKING IN A MIXED-SWATH-HEIGHT PRINTER

RELATED PATENT DOCUMENTS

This is a file-wrapper continuation of Ser. No. 08/400,056, filed Mar. 6, 1995, and now abandoned; which was in turn a continuation-in-part of copending U.S. application Ser. No. 08/145,261, entitled "MIXED RESOLUTION PRINTING FOR COLOR AND MONOCHROME PRINTERS" and filed Oct. 29, 1993, U.S. Pat. No. 5,949,453 in the names of Donald G. Harris, Majid Azmoon and Gary M. Nobel—and commonly owned herewith, and incorporated herein by reference.

This document also relates to the following copending applications which are commonly owned herewith, and which are incorporated herein by reference: Ser. No. 08/145,367, "INTERCONNECT SCHEME FOR MOUNTING DIFFERENTLY CONFIGURED PRINTHEADS IN THE SAME CARRIAGE", filed Oct. 29, 1993, U.S. Pat. No. 5,684,518 in the names of Gary M. Nobel, et al.; Ser. No. 08/56,345, "ELECTRICAL INTERCONNECT SYSTEM FOR A PRINTER", filed Apr. 30, 1993, U.S. Pat. No. 5,461,482 in the names of Arthur K. Wilson, et al.; Ser. No. 08/55,618, "MODULAR CARRIAGE ASSEMBLY FOR AN INKJET PRINTER", filed Apr. 30, 1993, in the names of Arthur K. Wilson, et al. had been abandoned and re-filed as Ser. No. 08/431,395 now U.S. Pat. No. 5,539,436; Ser. No. 08/56,009, "WIPING STRUCTURE FOR CLEANING ELECTRICAL CONTACTS FOR A PRINTER AND INK CARTRIDGE", Filed Apr. 30, 1993, U.S. Pat. No. 5,598,194 in the names of Corrina A. E. Hall, et al.; Ser. No. 08/56,961, "METHOD AND DEVICE FOR PREVENTING UNINTENDED USE OF PRINT CARTRIDGES", filed May 3, 1993, U.S. Pat. No. 5,519,422 in the names of Jeffrey A. Thornan, et al.; Ser. No. 08/57,241, "SIDE BIASED DATUM SCHEME FOR INKJET CARTRIDGE AND CARRIAGE", filed Apr. 30, 1993, U.S. Pat. No. 5,646,665 in the names of David W. Swanson, et al.; Ser. No. 07/958,833, "PRINTHEAD WITH REDUCED INTERCONNECTIONS TO A PRINTER", filed Oct. 8, 1992, has been abandoned and re-filed as Ser. No. 08/312,489 now U.S. Pat. No. 5,541,629 in the names of Michael B. Saunders, et al.; Ser. No. 08/056,263, entitled "INKING FOR COLOR-INKJET PRINTERS, USING NONINTEGRAL DROP AVERAGES, MEDIA-VARYING INKING, OR MORE THAN TWO DROPS PER PIXEL" and filed Apr. 30, 1993, U.S. Pat. No. 5,485,180 in the names of Ronald A. Askeland, Catherine B. Hunt, Keshava A. Prasad, Corrina A. E. Hall, Mark Stephen Hickman, Lance Cleveland, and William J. Allen; Ser. No. 08/056,633, entitled "MAXIMUM-DIAGONAL PRINT MASK AND MULTIPASS PRINTING MODES, FOR HIGH QUALITY AND HIGH THROUGHPUT WITH LIQUID-BASE INKS", and filed Apr. 30, 1993, U.S. Pat. No. 5,677,716 in the name of Lance Cleveland; and attorney dockets 1094941 and 1094942, later designated as Ser. Nos. 08/397,295, now U.S. Pat. No. 5,600,353 and Ser. No. 08/396,854, now abandoned, filed generally contemporaneously herewith in the name of Mark Stephen Hickman or Mark Stephen Hickman et al. and entitled respectively "COLOR INK JET PRINTING METHOD" and "COLOR INK JET PRINTING MECHANISM WITH ELONGATED BLACK NOZZLE ARRAY AND METHOD OF OPERATION".

BACKGROUND

1. Field of the Invention

This invention relates generally to machines and procedures for printing text or graphics on a printing medium such as paper, transparency stock, or other glossy media; and more particularly to a scanning thermal-inkjet machine and method that construct text or images from individual ink spots created on a printing medium, in a two-dimensional pixel array. The invention employs printmode techniques to optimize image quality and operating time, and also to minimize distortion of the image and of the printing medium.

2. Related Art

In a multiple-pen printer, it is important to as economically and simply as possible maximize both the output quality of a printed page and the speed at which that output can be obtained.

In a printer mechanism, the output quality of a printed page is a function of printhead resolution. The finer the resolution, the better the print quality.

Also, in a swath printer (e.g., one employing a scanning carriage with a pen capable of printing multiple pixel rows concurrently) the speed at which the output can be obtained is a function of the height of the swath which is covered by the printhead.

In multipen printers, until making of the invention covered by the Harris et al. document mentioned above, each pen had the same resolution and usually the same swath width. This meant that increasing resolution of any part of the system would require scaling up all the supporting structure, mechanics and electronics to support the resolution of the entire set of pens.

Thus heretofore in designing printing machines it has been necessary to confront difficult choices between high speed, high resolution and other print-quality characteristics, and economy. The aforementioned Harris, Azmoon and Nobel document, however, teaches that many such choices can be advantageously sidestepped.

Harris et al. provide within a single printer plural writing devices of different color, speed, swath height and resolution. The printer is programmed to operate the writing devices in a way that takes advantage of the swath height, speed and resolution characteristics of each writing device to obtain an enhanced mix of speed, resolution and economy.

For example, if one pen creates a relatively tall, high-resolution swath and is loaded with black ink, that pen can be used for relatively rapid throughput of black text or graphics alone. The printer is thereby capable of serving in the stead of a relatively fast, high-resolution black-text or black-only-graphics printer.

The same pen can be used for relatively rapid throughput of the black component of color images. Other pens, loaded with color inks—or another single pen capable of discharging different color inks—in the same printer can be used to form the chromatic components of color images. Thus addition of a relatively small amount of hardware enables the printer to do color work as well as fast, high-resolution black printing.

Providing just one pen of desired higher resolution and greater swath height—and providing in the same set other pens of lower resolution and lesser swath height—creates a plural-resolution, plural-swath-width system. Such a hybrid system is far less expensive than the full, major hardware scale-up, mentioned above, that would be needed for an all-high-resolution, all-high-swath-height printer.

Thus in the interest of economy the color pen or pens can be limited in capability to creation of a relatively shallow, lower-resolution swath. Most interestingly, such economy is not severely deleterious to printed results, inasmuch as the perceptual capability of the human eye is relatively insensitive to detail in chromatic features. Moreover, chromatic colors in a large fraction of practical cases (particularly in business graphics) are used only to provide color fill in relatively large, uniform fields.

Thus the invention of Harris, Azmoon and Nobel incorporate plural-resolution capabilities directly into the printer printheads, expanding the capabilities of the printer to achieve high-quality printing as well as greater throughput. Their invention decreases research and development costs as well as decreasing the time for bringing higher-resolution printers to market.

Harris et al. provide a color printer having one basic printhead resolution for color printing and a different basic printhead resolution for monochrome printing such as black printing. In a preferred form, a higher basic printhead resolution is provided for monochrome printing (particularly black) and a lower for color (particularly cyan, magenta and yellow). They integrate these black and color printing components into the same printing mechanism, providing composite printing of higher-resolution black and lower-resolution color concurrently.

Harris et al. furthermore provide increased throughput for the higher-resolution monochrome component of the color printer. In their preferred form, a taller-swath monochrome printhead such as a high-resolution black printhead which produces approximately dots of suitable size for spacing at 23.6 dots per mm (600 dots per inch, or "dpi") is mounted on the same carriage as shallower-swath color printheads such as lower-resolution cyan, magenta and yellow printheads which produce approximately 11.8 dots/mm-sized (300-dpi-sized) printout dots.

The taller-swath black printhead has overlapping printing alignment with all of the shallower-swath color printheads. The taller-swath black printhead has a three-hundred-nozzle swath with a nozzle pitch of about 0.042 mm ($\frac{1}{600}$ inch), to create a swath of approximately 12.7 mm (one-half inch), and the shallower-swath color printheads each have a hundred-nozzle swath with a nozzle pitch of about 0.085 mm ($\frac{1}{300}$ inch) to create a swath of approximately 8.5 mm (one-third inch).

The availability of plural writing devices of different character in a single printer, however, does not—in and of itself—cure every problem of swath-based printing technology. Some such problems that remain are outlined below.

Furthermore, under certain circumstances the use of plural writing devices of different character in a single printer can introduce undesired subtle patterning effects, of a sort not found in printers using only matched writing devices. In particular, when printing devices of different resolution are used together, dot-placement errors can differently affect printing at the different resolutions, degrading print quality at one or another resolution.

The present invention relates to certain of the remaining problems, and also certain subtle degradations that are inherent in the use of different plural writing devices together.

(a) Ink-flux effects—To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium.

These problems are well known in the art. Various techniques are known for use together to moderate these adverse drying-time effects and bulk- or gross-colorant effects.

(b) Staggered Pens—Colors can be separated during printing by use of staggered, i.e. vertically offset, pens. Such an approach is relatively undesirable because it requires a bigger carriage and a bigger printer, and also introduces additional complexity in mutual alignment of the several pens.

(c) Prior heat-application techniques—Among these techniques is heating the inked medium to accelerate evaporation of the water base or carrier. Heating, however, has limitations of its own; and in turn creates other difficulties due to heat-induced deformation of the printing medium.

Glossy stock warps severely in response to heat, and transparencies too can tolerate somewhat less heating than ordinary paper. Accordingly, heating has provided only limited improvement of drying characteristics for these plastic media.

As to paper, the application of heat and ink causes dimensional changes that affect the quality of the image or graphic. Specifically, it has been found preferable to precondition the paper by application of heat before contact of the ink; preheating, however, causes loss of moisture content and resultant shrinking of the paper fibers. Shrinkage is commonly nonuniform and creates gross distortions of the medium and naturally its image. Through closer control of the printing medium and the image segments near the ends of the pages, such problems have been mitigated but not entirely eliminated.

(d) Prior print-mode techniques—Another useful technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

Print modes have been designed to minimize the conspicuousness of image distortions arising in various ways. The aforementioned patent document of Cleveland presents an extensive discussion of some print modes and the problems they attack; a brief discussion appears shortly in another subsection hereunder.

The specific partial-inking pattern employed in each pass, and the way in which these different patterns add up to a single fully inked image, is known as a "print mode". Heretofore print modes have been substantially the same for all printheads (for example, all pens) used at any one time in each printer—and accordingly have been substantially the same for all colors printed concurrently in a given printer.

(e) "Concurrent" printing—As used in this document, the term "concurrently" is intended to encompass ongoing continuing operations of a generally unitary printing machine, such as for example (1) printing one color during one direction or scanning of a pen carriage, and forthwith printing another color in another direction of scanning; or (2) printing one group, e.g. some specified number of rows, of pixels in one set of passes across a print medium, and then printing another group of pixels that are interspersed among the first group, in another set of passes. Thus the word "concurrently" encompasses, but does not require, printing "simultaneously".

As used in this document, however, the word "concurrently" excludes such operations as printing one element (one color, or one group of pixels) for an entire page, or for an entire image, and then printing another element (another color or another group of pixels) for the same entire page or image. This sort of printing is excluded by the term "concurrently" whether the successive elements are printed on one generally unitary printing machine or on more than one such machine.

(f) Resolution—Furthermore printheads used together have had common size and provided common resolution. Accordingly partial-inking patterns have been substantially the same for the resolutions of all pens.

In this regard it is important to have a clear understanding of what is meant by the resolution of a pen, for purposes of the present document. High quality printers are typically characterized by numbers indicating their resolution in dots per millimeter (dots/mm) or dots per inch (dpi). This resolution is usually described by a pair of numbers, in the context of a two-dimensional coordinate system—where one number indicates the resolution along the x-axis (as used herein, x-axis means the axis of carriage scanning for a swath printer), and another number indicates the resolution in the y-axis (as used herein, y-axis means the axis of printing-medium advance for a swath printer). Thus, a resolution of 11.8/11.8 dots/mm (300/300 dpi) generally indicates a carriage-scan axis resolution of 11.8 dots per millimeter (300 dots per inch) and a printing-medium-advance axis resolution of 11.8 dots per millimeter (300 dots per inch).

The term "resolution" means ability to resolve or separate—usually to separate visually—two image elements or details. In one sense, resolution of a printoff, head is primarily determined by the actual printout dot size as it appears in a printout, since perceptual separation is difficult for two large dots even if their centers are geometrically displaced, by some distance smaller than their radii. So in one ideal theoretical world, an 11.8 dot/mm (300 dpi) printhead is presumed to produce a printout dot size which is approximately 0.085 mm (1/300 inch) in diameter.

In another and more fundamental sense, however, dot size can be subordinated to center-to-center spacing, since resolution finer than center-to-center spacing is a technical impossibility regardless of dot size. Therefore, various common language usages have developed which define resolution in other closely related terms. For example, the resolution of a printhead is often identified by its nozzle pitch (i.e., the distance between adjacent nozzles on a printhead), and a print mode resolution is often identified by its pixel addressability (i.e., the distance between adjacent pixels in a printout).

There are several print mode techniques for enhancing the print-quality characteristics of a printhead. For example, an 11.8 dot/mm (1/300 inch) nozzle-pitch printhead can be used to create a 23.6 dot/mm (600 pixel/inch) printout along the print-medium-advance axis by changing the incremental advance distance of the medium at the end of a swath and then employing a multipass print mode.

Such a system which provides printout pitch that is finer than the hardware pitch is sometimes called an "addressable" fine-pitch or high-resolution system. As another example, an 11.8 dot/mm (1/300 inch) nozzle-pitch printhead could be used to create a 23.6 dot/mm (600 pixoff, el/inch) printout along the carriage-scan axis by suitably choosing the firing frequency of the printhead or the carriage scan speed, or both.

Implementing these different print modes, however, is rather complicated and requires sophisticated programming techniques, precisely engineered mechanical parts, and many circuit components. Moreover, the print quality of a lower-resolution machine which has a 23.6 dot/mm (600 dpi) "addressable" print mode is not as good as the print quality of a true 23.6 dot/mm-resolution (600 -dpi-resolution) machine in which both smallest dot size and addressability are each equal to 23.6 dots/mm (600 dpi).

Some print modes such as square or rectangular checkerboard-like patterns tend to create objectionable moire effects when frequencies or harmonics generated within the patterns are close to the frequencies or harmonics of interacting subsystems. Such interfering frequencies may arise, for example, in dithering subsystems sometimes used to help control the paper advance or the pen speed.

(g) Known technology of print modes: general introduction—One particularly simple way to divide up a desired amount of ink into more than one pen pass is the checkerboard pattern mentioned above: every other pixel location is printed on one pass, and then the blanks are filled in on the next pass.

To avoid horizontal "banding" problems (and sometimes minimize the moire patterns) discussed above, a print mode may be constructed so that the paper advances between each initial-swath scan of the pen and the corresponding fill-swath scan or scans. In fact this can be done in such a way that each pen scan functions in part as an initial-swath scan (for one portion of the printing medium) and in part as a fill-swath scan.

Once again this technique tends to distribute rather than accumulate print-mechanism error that is impossible or expensive to reduce. The result is to minimize the conspicuousness of—or, in simpler terms, to hide—the error at minimal cost.

(h) Print masks vs. inking locations—Masking relates to addressability of pixel positions in each operation of a printing device (for example, each pass of a transversely scanning pen). Actual inking (or actual addressing) of particular pixels is thus a very different matter from masking.

Actual inking depends upon not only (1) addressability but also (2) the desired-image data which a particular user supplies to the printer—in effect, the image detail which the user wishes to see in the vicinity of each pixel—and (3) various special procedures, known as "rendition", employed to translate desired image details into a pattern of ink dots which the printer can produce.

Thus desired-image data and rendition procedures typically prevent actual inking of most colors (or, in many systems, almost all colors) in each pixel position. This is true even for a pixel which is addressable for all, or almost all, colors if only print masking alone is considered.

Conversely, in any given operation of a given printing device (e.g., pen pass) even if image data and rendition call for printing a particular color at a particular pixel, that color may not be printed at that pixel. Depending on the masking scheme in use, that color may have been printed there already in a previous operation, or may be reserved for printing there in a later operation, of that same (or another) printing device.

(i) Print masks vs. unit quantity of colorant—In some devices heretofore, different quantities (for example, a different number of drops) of ink are provided for different colors. This is particularly true for different types of printing media.

Thus in printing on transparency stock (plastic sheets used for making, as an example, masters that can be projected on a screen by an overhead projector) it is necessary to provide much more colorant than when printing on paper. Similarly glossy stock (plastic-coated paper popular as cover sheets for reports or looseleaf books) requires more colorant than ordinary paper requires, to produce a like impression of color vividness.

Variable inking in such situations, whether for different colors or different media, or different crosscombinations of the two, is produced in rendition. Here too, this is not a matter of masking—which relates only to assigning particular color-to-pixel applications to particular printing-device operations. In all such situations, the masking heretofore is the same for all printing devices and all colors within any given printer.

The same is true whether the unit quantity for each color is one dot of colorant, or plural dots, or even fractional dots (as described for example in the aforementioned patent document of Askeland et al.). It is also true whether printing is binary (go or no-go, for each color) or plural-level (for instance any number of color-quantity units from zero to $2^n$, for each color, where n is the number of data bits in the color-specification system). In all these variants, masking is common to all colors and all printing devices used concurrently within any one printer.

(j) Print-mode masks: space- and sweep-rotated, and autorotating—The pattern used in printing each nozzle section is known as the "print-mode mask". The term "print mode" is more general, usually encompassing a description of a mask, the number of passes required to reach full density and the number of drops per pixel defining "full density".

Operating parameters can be selected in such a way that, in effect, rotation occurs even though the pen pattern is consistent over the whole pen array and is never changed between passes. Figuratively speaking this can be regarded as "automatic" rotation or simply "autorotation".

The Cleveland patent document mentioned earlier discusses these techniques at greater length.

(k) Conclusion—As pointed out above, availability of plural writing devices of different character in a single printer has left some problems remaining to be solved in swath-based printing technology. As also noted above, use of plural writing devices of different character in a single printer can itself introduce subtle undesired effects not found in printers using matched writing devices exclusively.

Thus important aspects of the technology used in the field of the invention are amenable to useful refinement.

SUMMARY OF THE DISCLOSURE

The present invention introduces such refinement. In its preferred embodiments, the present invention has more than one aspect or facet that can be used independently, although they are preferably employed together to optimize their benefits.

The invention relates to exploiting the presence of different writing devices in a single printer to ameliorate certain of the remaining problems mentioned above, or certain effects newly introduced by using writing devices of different character together in one printer.

In preferred embodiments of a first of its facets or aspects, the invention is a mixed-swath-height printer. It is used for forming images as an assemblage of ink dots at pixel locations on a printing medium.

The printer includes some means for holding the print medium. Any of a great variety of means may be used for this purpose; therefore, and for purposes of breadth and generality, these means will be called the "print-medium holding means".

In addition the printer includes some means for operating to print on the medium an image swath having a first swath height. Again for generality and breadth these means will be called simply the "first printing means".

The printer also has some means for concurrently operating to print on the medium an image swath having a second swath height that is greater than the first swath height; these will be called the "second printing means". (As stated earlier this language encompasses printing of the second, taller swath height simultaneously, or within the ongoing continuous operation of a single printing machine—but not by successive passes of one or more machines over an entire page or an entire image.)

Also the printer includes some means for supporting the first and second printing means in common together, relative to the print-medium holding means. These means will be called the "common supporting means" or more simply "supporting means".

The printer furthermore includes some means for controlling the first printing means to apply ink to the medium by addressing the pixel locations at a first pixel density. These means will be called the "first controlling means" or simply the "controlling means".

Finally the printer includes some means for concurrently controlling the second printing means to apply ink to the medium by addressing the pixel locations at a second pixel density that is different from the first pixel density. These means will be called the "second controlling means" or for perhaps greater clarity the "concurrently-controlling means".

The foregoing may constitute a description or definition of the first facet of the invention in its broadest or most general form. Even in this general form, however, it can be seen that this aspect of the invention significantly mitigate the difficulties left unresolved in the art.

In particular, through use of different pixel densities for different swath heights, the invention takes advantage of the additional degree of freedom to improve aspects of printing performance related to drying time, print-medium and image deformation, or chemical interactions between different colorants.

Although this aspect of the invention in its broad form thus represents a significant advance in the art, it is preferably practiced in conjunction with certain other features or characteristics that further enhance enjoyment of overall benefits.

For example, it is preferred that the printer further include some means for providing relative motion of the medium with respect to the first and second printing means. The motion mentioned here is generally parallel to the swath heights. These means will be called the "relative-motion means".

In this regard it is further preferred that the printer include some means for actuating the relative-motion means in conjunction with printing by said first and second printing means. These means will be called the "actuating means". It is preferable that the actuating means include some means for actuating the relative-motion means in alternation with printing by said printing means.

Preferably the second pixel density is lower than the first pixel density. In other words, the concurrently-controlling means preferably include some means for controlling the second printing means to apply ink to the medium by addressing the pixel locations at a second pixel density that is lower than the first pixel density. The term "submultiple", by plain analogy with terms such as "subharmonic", means a fractional value; thus for purposes of this document an "integral submultiple" is a fraction whose numerator is 1 and whose denominator is an integral.

Using this form of the invention enables reduction of drying time, bleed, paper curl and cockle, image deformation, and several other related limitations discussed earlier. These benefits have relatively wide applicability.

Another form of the invention, however, is also significant, though under somewhat more-special circumstances. In this form of the invention, the second printing means apply ink at a higher pixel density than the first pixel density. This usage is preferable for mutually reactive inks, to permit relatively long drying times after putting down ink in, for example, one end of the taller swath—before beginning to print ink in the shallower swath.

It is also preferable that the relative shift (of the medium with respect to the first and second printing means) be less than the second swath height. In other words, preferably the actuating means include some means for actuating the relative-motion means to provide a relative shift that is less than the second swath height. More specifically it is preferred that the relative shift be one-third of the second swath height.

In one particular printing environment it is also preferable that the relative shift be less than the first swath height—and, again more specifically, one-half of the first swath height. In another printing environment it is preferable instead that the relative shift be equal to the first swath height. These alternative preferences will be discussed further in the detailed-description section of this document.

Another preference is that the relative shift be a first fraction of the first swath height and a second fraction of the second swath height F3. Preferably the first and second fractions are ½ and ⅓ respectively.

Moreover it is preferred that each height segment, on the medium, equal to said relative shift be addressed during more operations of the second printing means than of the first printing means. For example, in a printer which advances the printing medium, "each height segment equal to the relative shift" will be recognized as the distance of printing-medium advance—or in other words the height of a print-medium-advance strip or subswath—and each such subswath may be addressed by three operations of the second printing means, but e.g. only one or two operations of the first.

In one printing environment preferably the first printing means include plural discrete printing-means bodies, each carrying a respective array of colorant-dispensing devices; and the plural arrays of colorant-dispensing devices have a common dispensing-device array height substantially equal to the first swath height. In this case preferably the second printing means include at east one array of colorant-dispensing devices having a dispensing-device array height substantially equal to the second swath height. For this situation it is preferred that the common supporting means include a common carriage, which carries the first and second printing means in common for scanning together across the medium.

In this printing environment, preferably the plural printing bodies comprise three discrete pens. Preferably each pen carries a different chromatic-colorant ink respectively; and in this case also preferably the second printing means comprise a pen carrying black ink.

It is preferable in an alternative printing environment that the first printing means comprise plural colorant-supply chambers, and associated therewith plural arrays of colorant-dispensing devices respectively, in a common printing-means body. The plural arrays of colorant-dispensing devices have a common array height substantially equal to the first swath height; the second printing means include at least one array of colorant dispensing devices, with an array height substantially equal to the second swath height; and the common supporting means include a common carriage which carries the first and second printing means in common for scanning together across the medium. Here it is preferable that each of the plural colorant-supply chambers carry a different chromatic colorant respectively, and that the second printing means carry black colorant.

In preferred embodiments of a second aspect of the invention, the invention is a method of forming images as an assemblage of ink dots at pixel locations on a printing medium. This method includes the step of printing on the medium an image swath having a first swath height.

The method also includes the step of concurrently printing on the medium an image swath having a second swath height that is greater than the first swath height. An additional step is controlling the first-swath-height printing step to apply ink to the medium by addressing such pixel locations at a first pixel density.

A still further step is concurrently controlling the second-swath-height printing step to apply ink to such medium by addressing such pixel locations at a second pixel density that is different from the first pixel density.

The foregoing may represent a definition or description of the second aspect of the invention in its most general or broad form. Even in this form, however, it can be seen that this aspect of the invention significantly advances the art.

Benefits are enjoyed that are related to those associated with the printer aspect of the invention. The invention can improve aspects of printing performance related to drying time, print-medium and image deformation, or chemical interactions between different colorants Nonetheless still further advantages may be gained by incorporating other features or characteristics. For instance it is preferred that the second pixel density be lower than the first pixel density. In this case it is preferred that the printing and concurrently-printing steps include addressing to each pixel, for each colorant, an inking level that is either:

binary color, in which each pixel either receives or does not receive one specific number of dots for each colorant respectively; or plural-bit color, in which each pixel receives a number of dots, for each colorant respectively, which can vary between zero and $2^n-1$ times a specific number of dots for each colorant, where $n \geq 2$ is a number of bits characterizing said plural-bit color.

In plural-bit color, the total number of possible values for the number of dots is $2^n$; however, one of these values is zero, leaving the remainder $2^n-1$ as the number of nonzero values.

Thus for example in two-bit color, the number of possible values is $2^n=2^2=4$ possible values. The lowest of these values is zero, and the highest is $2^n-1=2^2-1=3$, so the number of dot units applied at each pixel can be any one of the four values zero, one, two and three.

(The average number of dots in each such "dot unit" is a separate consideration. As shown in the above-mentioned Askeland et al. document this number may assume any suitable value such as for instance 2½.)

Another way to look at the choice between binary color and plural-bit color is that the inking level varies between zero and $2^n-1$ times a specific number of dots for each colorant, where n may vary from one, inclusive, upward. If n=1, then there are $2^n=2^1=2$ possible values, one of which is zero, and the greater of which is $2^n-1=2^1-1=1$; so the number of dot units at each pixel can be either zero or one—a definition of "binary color" printing.

All of the foregoing operational principles and advantages of the present invention will be more fully appreciated upon consideration of the following detailed description, with reference to the appended drawings, of which:

Figure 1:
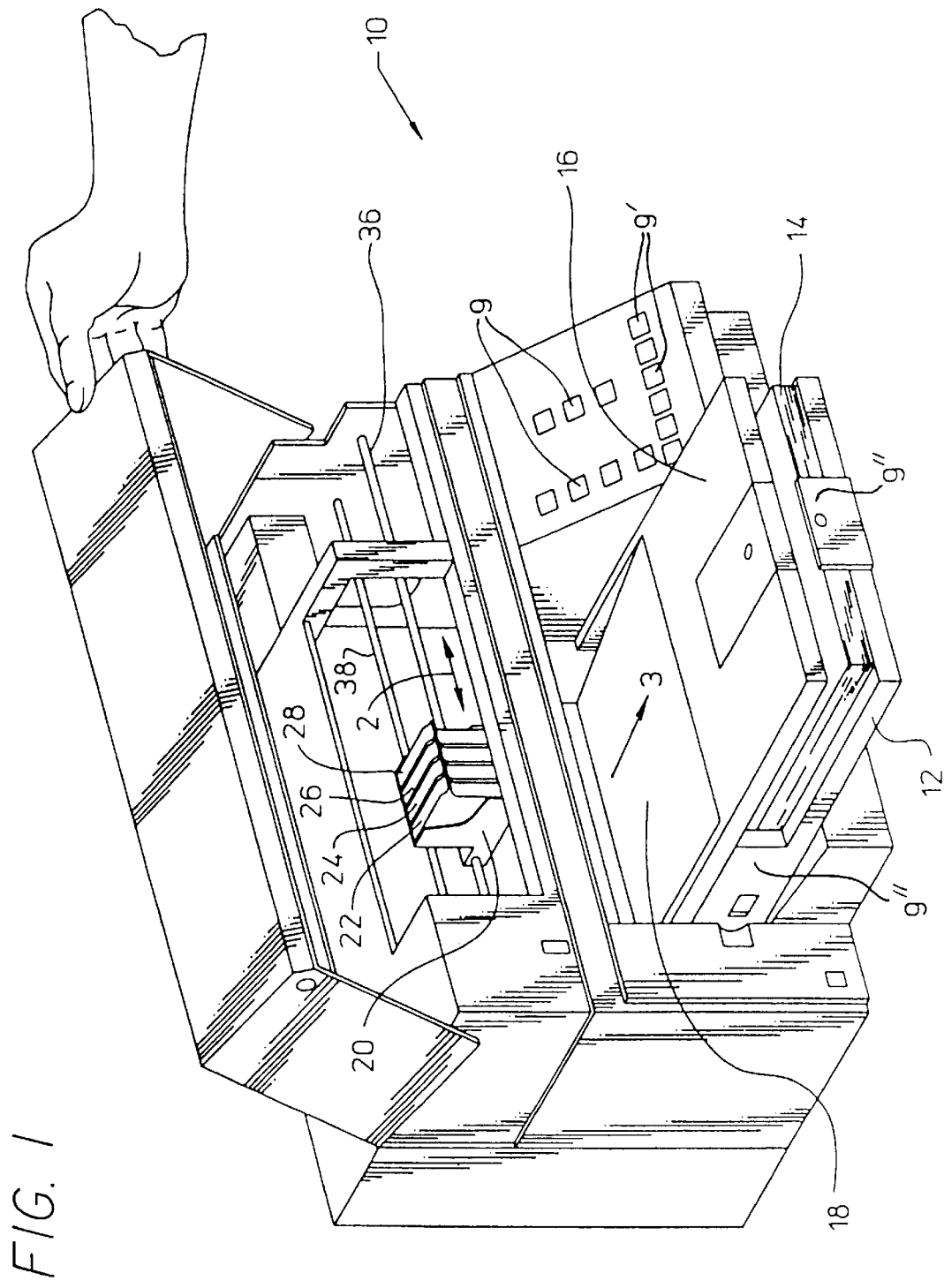
FIG. 1 is a perspective or isometric view of a first printing environment in which preferred embodiments of the present invention have been found satisfactory: it is a representative inkjet printer which can incorporate the apparatus and method of the present invention.

DETAILED DESCRIPTION OF THE
PREFERRED EMBODIMENTS

1. A First Preferred Printing Environment

In one now-preferred embodiment of the invention disclosed herein, a 23.6 dot/mm (600 dpi), 12.7-mm-swath (one-half-inch-swath) black pen is combined with three 11.8 dot/mm (300 dpi) color pens each generating a swath approximately 8.5 mm (one-third inch) tall. The invention is useful for applying text or graphics, or both, to media using monochrome, color, or mixed monochrome and color components.

The high-performance black-ink-dispensing pen is typically used for printing text and other "black only" features, and thus the output quality and throughput of these features is greater. It also improves the output quality of color graphics and color features by teaming with the three lower-performance color-ink pens when printing color graphics or color features.

The black component of the graphics, which is often a large portion of color graphics content, is at a higher resolution and thus at a higher output-quality level. The taller swath can then be combined with printing algorithms to improve the throughput of color graphics as described in this document.

The printer 10 (FIG. 1) has an input tray 12 containing sheets of printing medium 14, which pass through a printing zone and along a printing-medium advance direction 3 past an exit 18 into an output tray 16. Electronic controls 9, 9' for commanding a microprocessor within the printer to perform various functions, and mechanical controls 9" for restraining and adjusting the printing-medium supply in the advance direction, are included.

A movable carriage 20 (FIGS. 1 and 2) holds print cartridges 22, 24, 26, and 28 which respectively hold yellow (Y), magenta (M), cyan (C) and black (K) inks—and dispense these inks upon command from a microprocessor within the printer. The back of the carriage 20 has multiple bushings such as 34 which ride along a slide rod 36, enabling bidirectional movement of the carriage along the rod.

The carriage 20 thus moves along a carriage-scanning direction 2, above a sheet of printing medium 14' (FIG. 1) upon which an image is being formed by the print cartridges 22–28. The front of the carriage 20 has a support bumper 30 which rides along a guide 32.

The position of the carriage, as it traverses the medium back and forth, is determined from an encoder strip 38 (FIG. 1). This very accurate positioning enables selective firing of the various ink nozzles on each print cartridge at the appropriate times during each carriage scan.

A respective 11.8 dot/mm (300 dpi) color inkjet cartridge 40 (FIGS. 3 through 6, also identifiable as any one of the three color-ink print cartridges 22, 24, 26) having a tab circuit with a four-column, thirty-two pad electrical interconnect 42 is removably installed in each of three chutes 44, 46, 48 of a unitary carriage 50/20. a flex-circuit member 52 having three matching sets of conductive pads 54, 56, 58 is mounted on flex-frame pins 60, to operatively engage the cartridge pads as each cartridge is inserted into its appropriate chute.

Figure 2:
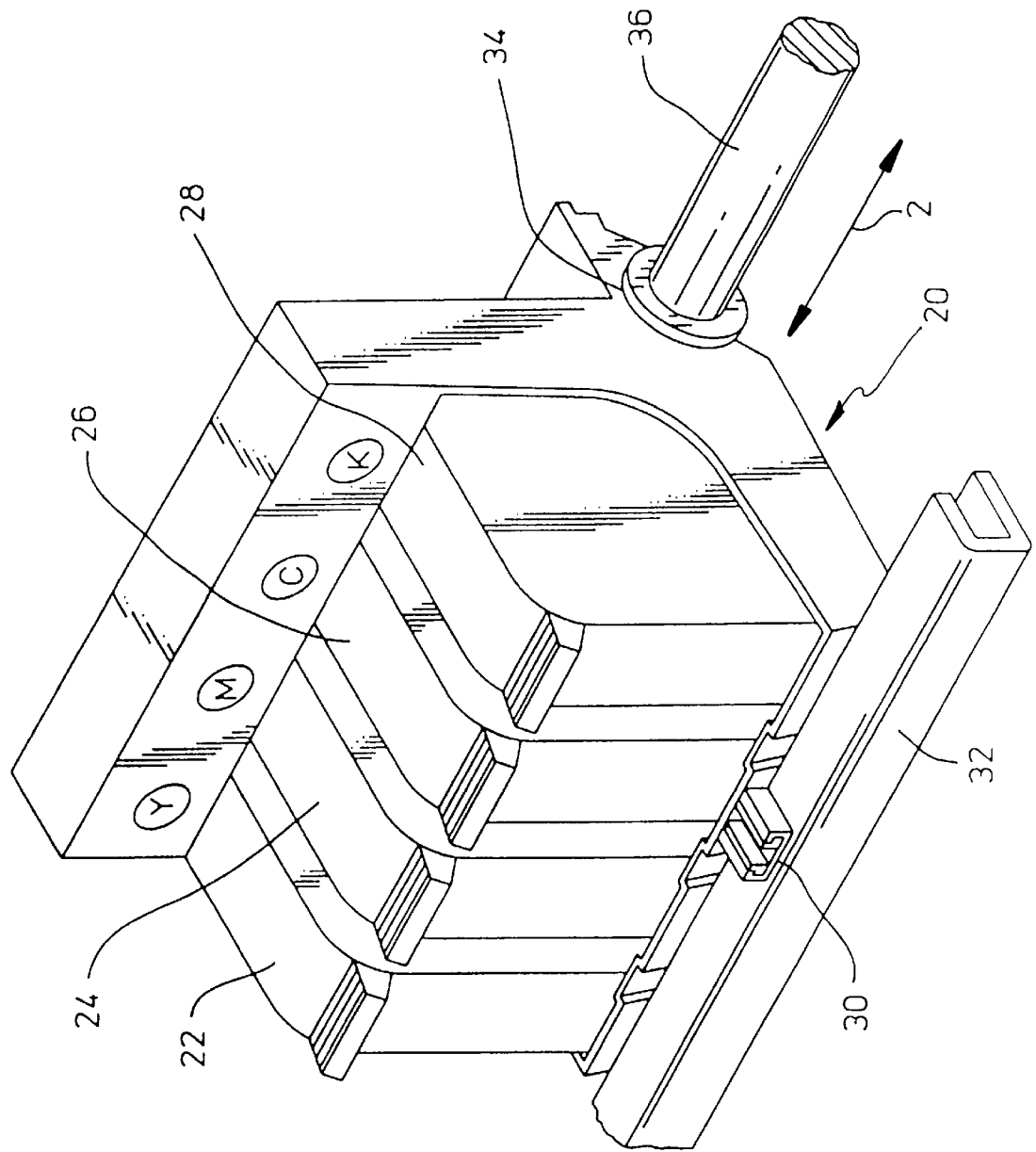
FIG. 2 is a like view, but enlarged, of a carriage having removable multicolor print cartridges, usable in the FIG. 1 printer.
Figure 3:
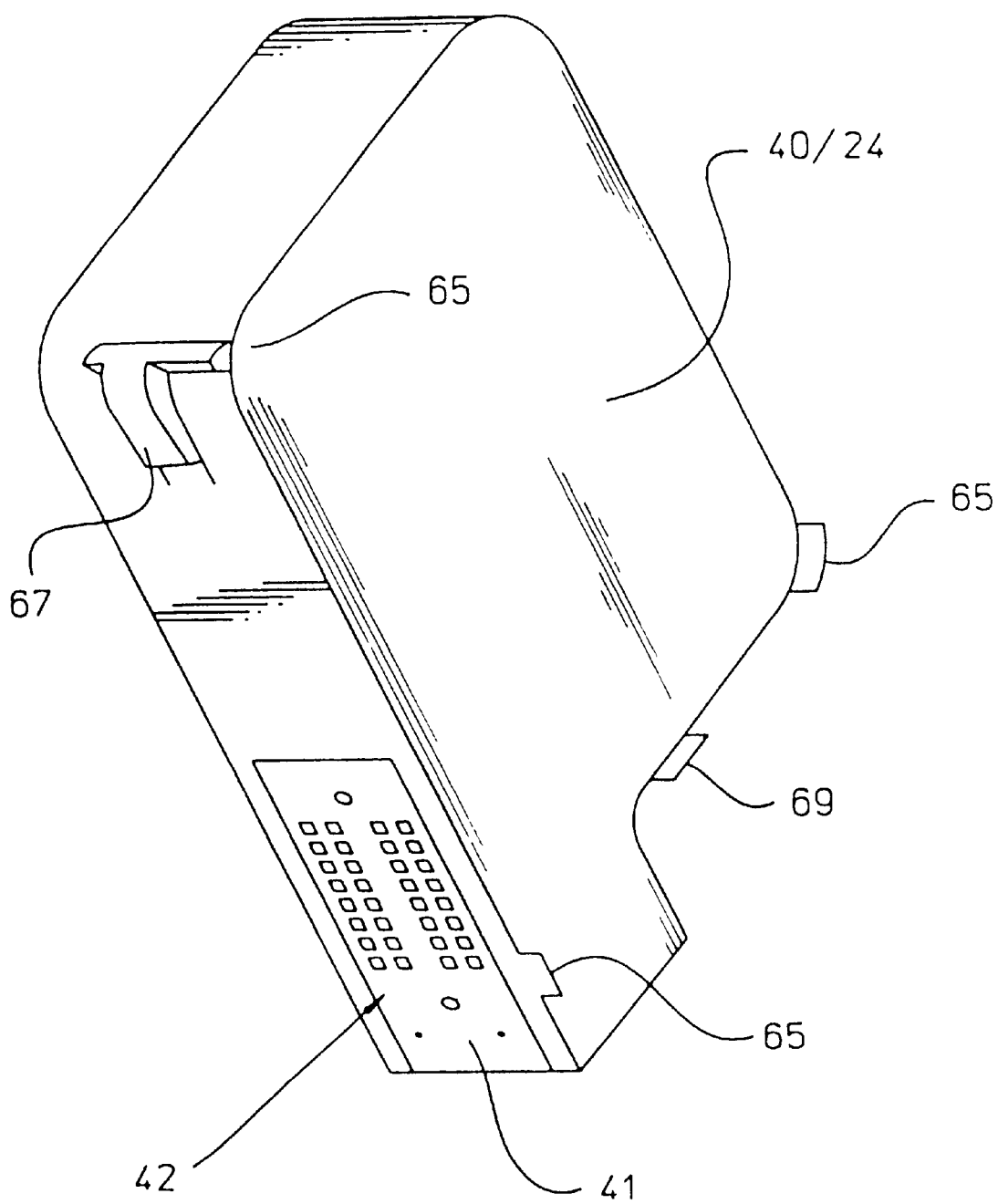
FIG. 3 is a like view, but still further enlarged and generally from the rear, of an exemplary lower-resolution color inkjet print cartridge used in the FIG. 1 and 2 preferred embodiment.
Figure 4:
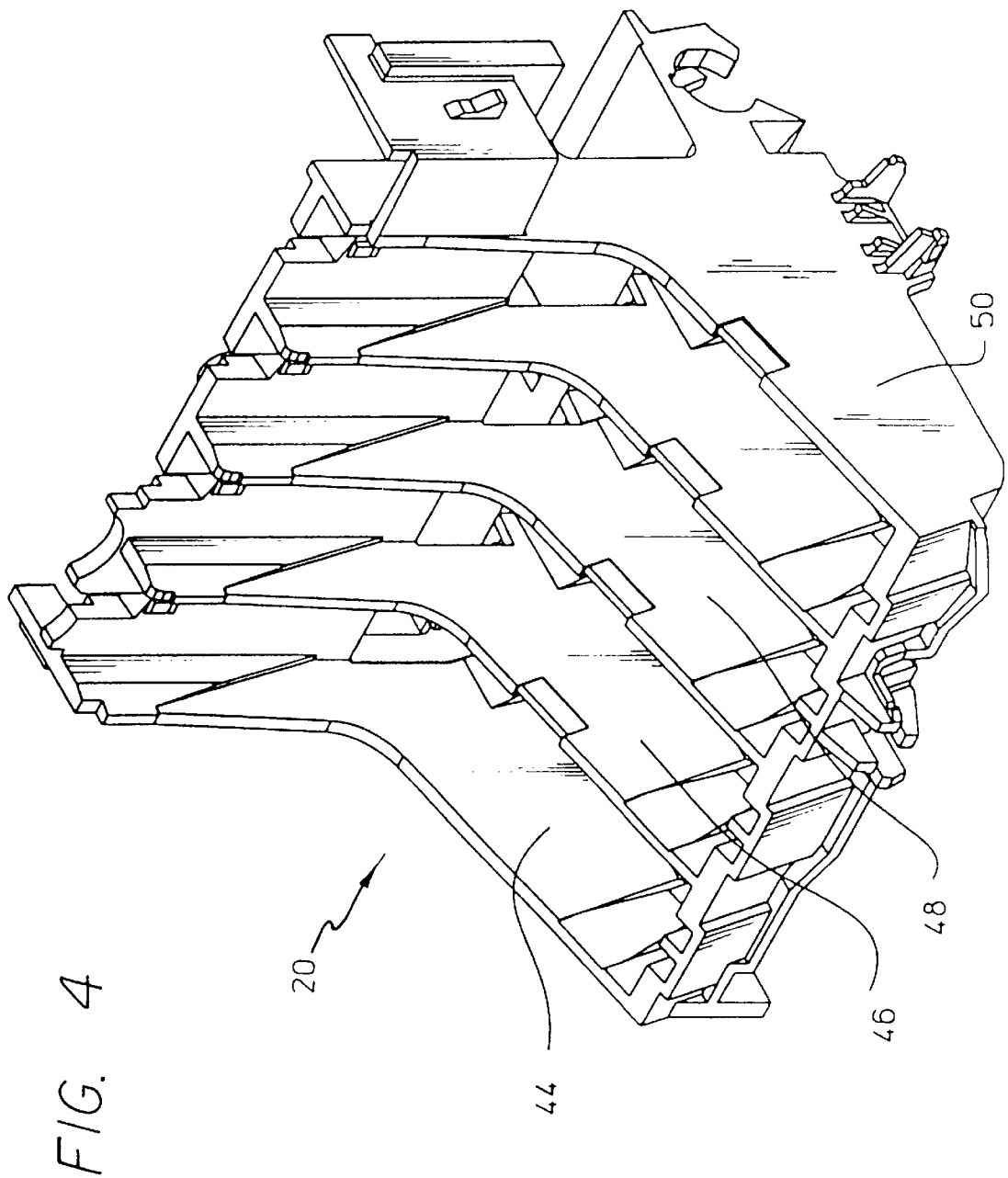
FIG. 4 is a like view of the FIG. 2 carriage, but without the print cartridges shown in FIG. 2.
Figure 5:
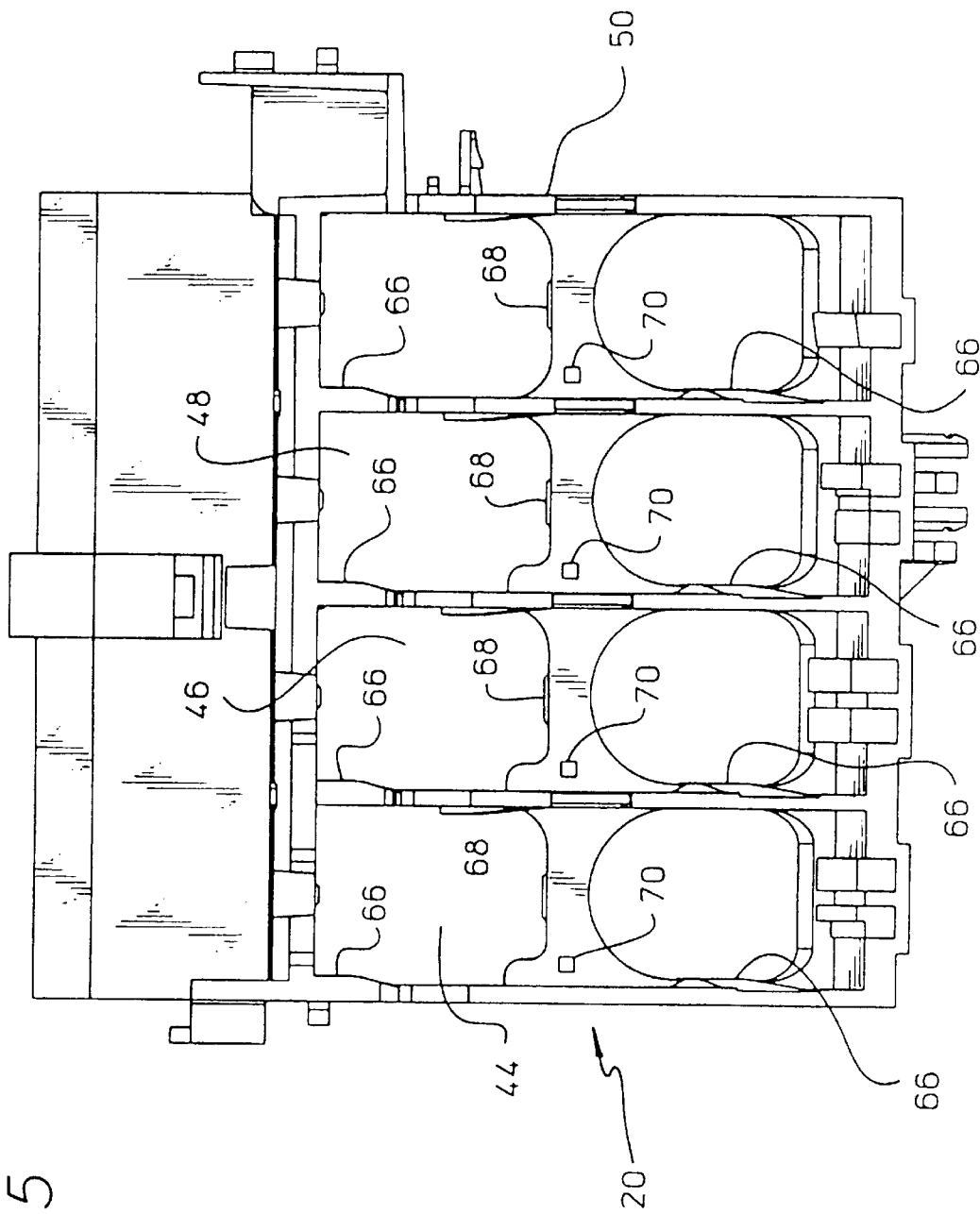
FIG. 5 is a top plan of the FIG. 2 and 4 carriage.
Figure 6:
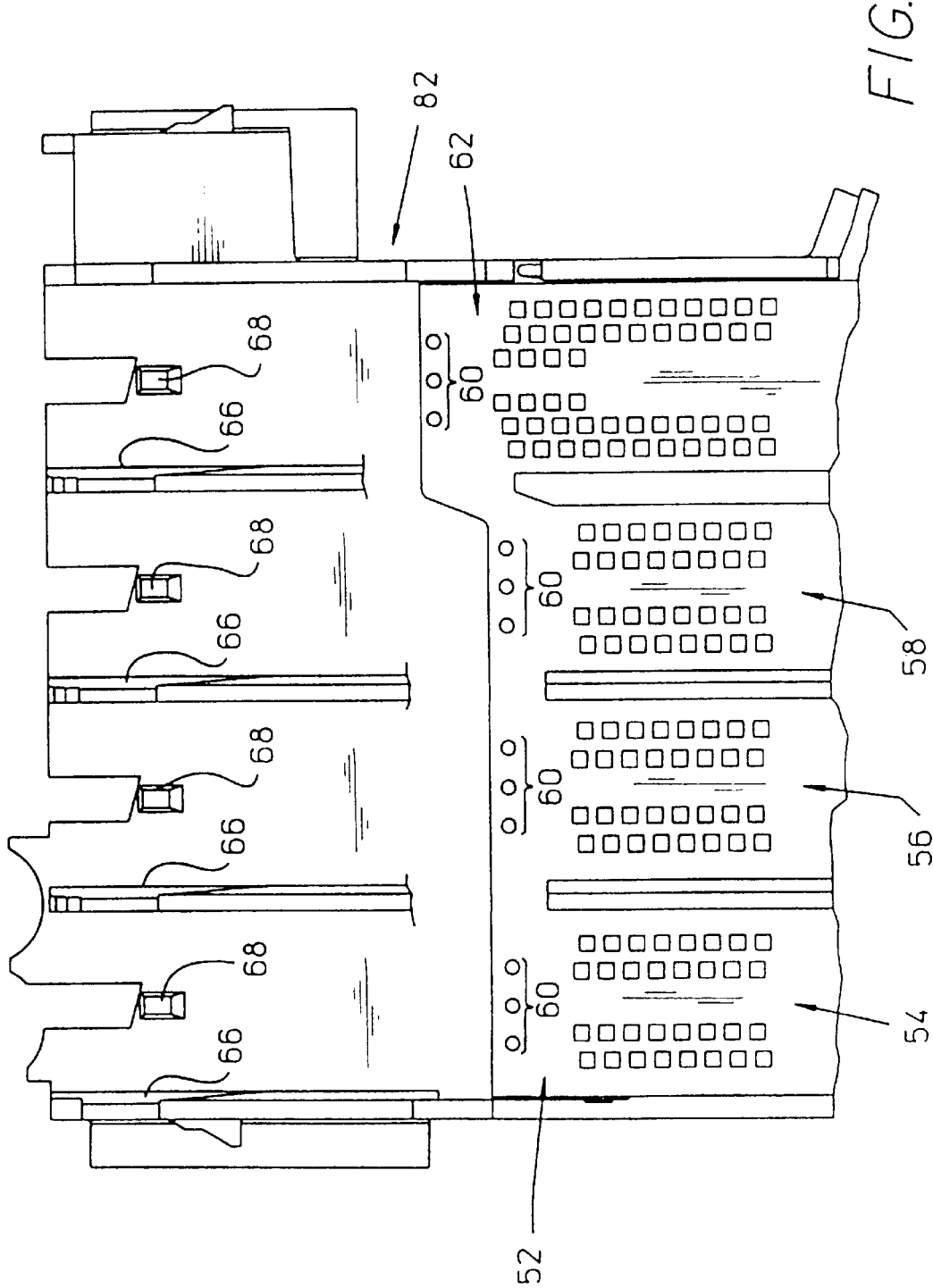
FIG. 6 is a fragmentary elevation of the flex-circuit interconnect on the carriage of FIGS. 4 and 5, with the interior carriage walls partially cut away.
Figure 9:
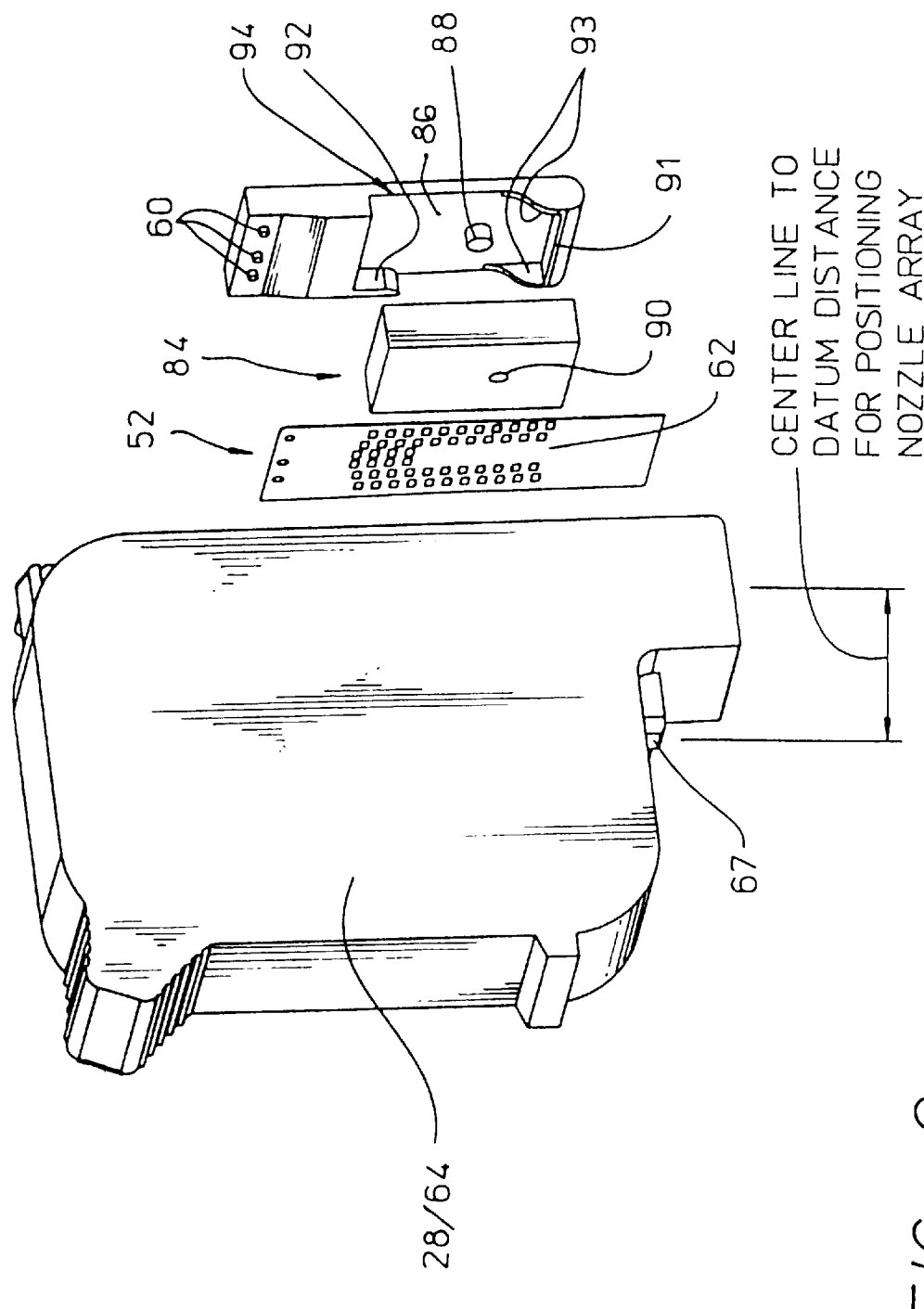
FIG. 9 is a somewhat schematic partially exploded perspective or isometric view of a higher-resolution black inkjet pen cartridge of the FIG. 2 carriage system, together with a corresponding flex-circuit termination, and a mounting bracket that is a fragment of the FIG. 2 carriage—particularly showing the use of a foam member for operatively connecting the flex-circuit to the cartridge.

An enlarged set of conductive pads 62 covering a larger area, having a different layout, and constituting an array of six columns totaling fifty-two conductive pads on the flex-circuit member, is designed for operative engagement with cartridge pads on a 23.6 dot/mm (600 dpi) black inkjet cartridge 64 (FIG. 9, also identifiable as print cartridge 28 of FIGS. 1 and 2).

Preferred structure and techniques for preventing mistaken installation of a 23.6 dot/mm black-ink printhead in a color-ink printhead chute—or alternatively the mistaken installation of an 11.8 dot/mm color-ink printhead in a black-ink printhead chute—are described in the copending applications identified above and incorporated by reference into this document.

Because of the differently configured electrical interconnect on the 23.6 dot/mm (600 dpi) cartridge 28/64, and in order to avoid substantially changing the existing X/Y/Z datum configuration of the carriage, a unique interconnect scheme is employed. Details appear in the Harris et al. document and related copending applications identified above and incorporated by reference herein.

As suggested in FIG. 9, for satisfactory performance particular attention and care must be given to proper alignment of the black-ink cartridge 28/64 relative to the other cartridges 40/22–26 and relative to the printing medium 14', and full contact of the larger electrical-interconnect surface area 52—with its greater number of individual contacts. It has been found that this objective is met particularly well through incorporation of a unique spring assembly for the 600 dpi cartridge interconnect.

This assembly includes a unitary resilient foam biasing member 84 which has been found to importantly provide more-uniform interface connection pressure over the full interconnect area. The foam biasing member 84 fits in a seat 86 (FIG. 9), which is formed as part of the carriage cradle 20/50.

A mounting peg 88, protruding from the seat 86, fits into a matching hole 90 in the foam member 84. This interfit, along with bottom and lower ledges 91, 93 and upper side and top ledges 92, 94 of the seat 86, holds the foam member 84 in proper position to assure operative engagement across the electrical interconnect 52.

For the shallower-swath, lower-resolution color-ink pens, with their smaller number of interface connections, a more-conventional metallic spring (not shown) has been found entirely adequate to ensure reliable contact at all the connection points. Once again, the documents mentioned above present fuller details, particularly for the structure and function of the flex-circuit frame, which has been modified for the taller print cartridge 28/64.

Preferred mounting relationships between an 11.8 dot/mm (300 dpi) nozzle array 96 (FIGS. 7 and 8) of the color-ink-dispensing printheads and a 23.6 dot/mm (600 dpi) nozzle array 98 of the taller, black-ink-dispensing printhead 28/64 are also important to satisfactory performance. Control circuitry 99 on the substrate includes multiplexing to enable the three hundred firing resistors 97 of the black-ink printhead to be controlled through fifty-two electrical interconnect pads 62.

Analogous features enable all one hundred four firing resistors 97' of each color-ink printhead to be controlled through thirty-two electrical interconnect pads. The multiplexing circuit scheme for such control circuitry is described more fully in the other documents identified above and incorporated herein by reference.

Figure 8:
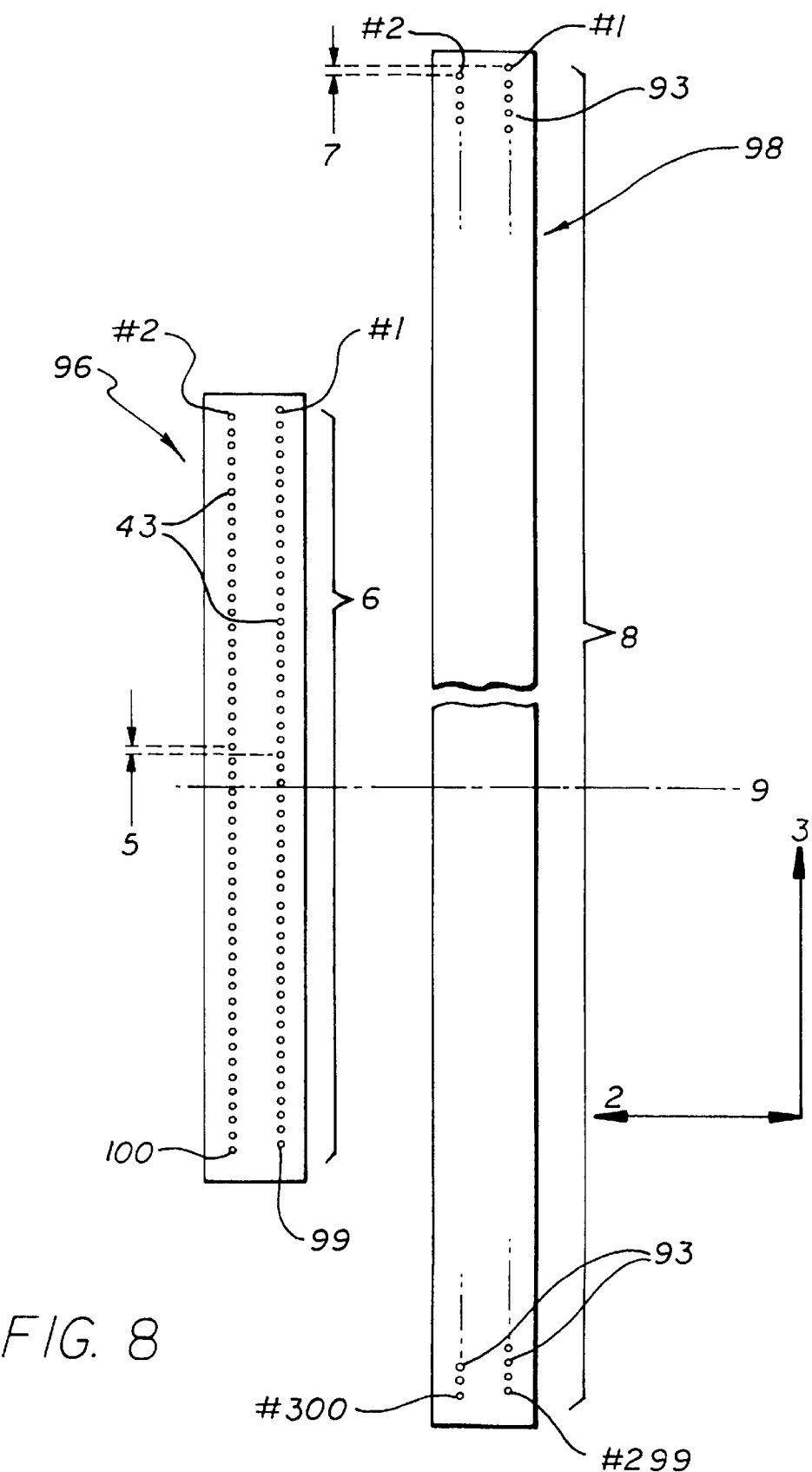
FIG. 8 is a somewhat schematic bottom plan—i.e., as seen looking up from the printing medium—of the FIG. 7 nozzle arrays, showing their alignment relationships.

FIG. 8 shows very schematically side by side the nozzle plate 98 of the black-ink pen 28 and a representative nozzle plate 96 of one (22, 24 or 26) of the three color-ink pens. FIG. 8 is not to scale, particularly with respect to nozzle spacing 5, 7 or its reciprocal, nozzle pitch, for either the color- or black-ink plate 96, 98.

Actually along the medium-advance axis 3 the nozzle spacing 7 in the black pen is half the nozzle spacing 5 in the color pen. Therefore within the 8.5 mm (⅓ inch) swath height 6 (of the color pen) indicated in the drawing are for example one hundred nozzles #1 through #100 of the color-ink nozzle plate 96—and two hundred nozzles, for example #51 through #250, of the black-ink plate 98.

Accordingly the remaining 300–200=100 nozzles of the black-ink plate are outside the 8.5 mm color swath height 6. In the printer configuration illustrated here by way of example, these two pens are mutually centered about a common centerline 9, so that—of the hundred black-ink nozzles 93 outside the 8.5 mm color swath height 6—fifty nozzles #1 through #50 are above and fifty nozzles #251 through #300 below.

Nozzles conventionally are numbered for addressing purposes. Black-pen nozzles #1 through #50 are above (with respect to the "up" direction along the printing medium) color-pen nozzle #1; and black-pen nozzles #251 through 300 are below color-pen nozzle #100.

As noted above the foregoing discussion refers to a very schematic representation (FIG. 8), and the preferred color-ink printhead actually has one hundred four firing resistors—and corresponding nozzles—rather than one hundred. Thus some relations described above are simplified for purposes of explanation and merely representative of actually preferred numbers and alignments of nozzles.

In one particularly preferred form of the invention, one hundred four color-ink nozzles are present, and their swath encompasses two hundred eight of the three hundred black-ink nozzles; thus only ninety-two black-ink nozzles are outside the color swath. Forty-four are above, and forty-eight below.

All of the color- and black-ink nozzles within the color-ink swath can be used together, for maximum throughput; however, for certain aspects of the present invention (particularly low pixel density) it has been found preferable to actually use only ninety-six of the one hundred four color nozzles. Within this restrained color swath are one hundred ninety-two black-ink nozzles.

This preference arises from various practical considerations, such as the number of desired swaths per nozzle. In view of the disclosures herein, such considerations will be clear to those skilled in the art.

2. A Second Preferred Printing Environment

Many or most of the features described in the immediately preceding subsection are equally applicable here. Accordingly this discussion focuses on some of the more-salient differences.

Features of this second printing environment, shown in FIGS. 10 through 16, which correspond to features of the first printing environment in FIGS. 1 through 9, have been given like reference numerals but with a distinguishing prefix "1". (Hence for example the black-ink pens 98 and 198.)

Whereas four separate, discrete pens 22, 24, 26, 28 (FIG. 1) are in the first printer, only two pen bodies 122, 128 (FIG. 10) are in this second printer. One pen body 122, however, is wider than the other pen body 128 and—compared with the separate color pens 22, 24, 26 discussed earlier—has a relatively large number of individual connections in its interface pad 142 (FIGS. 11 through 13).

Figure 12:
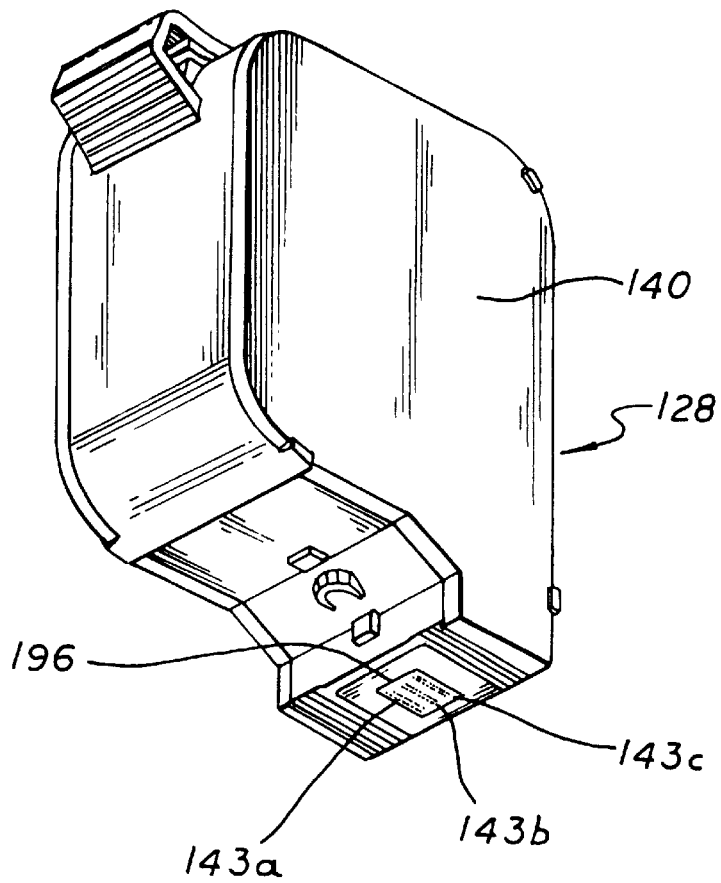
FIG. 12 is a like view but from the front and below, and particularly showing the three sets of nozzles, i.e. the nozzle array or arrays, of the FIG. 11 trichamber pen.
Figure 13:
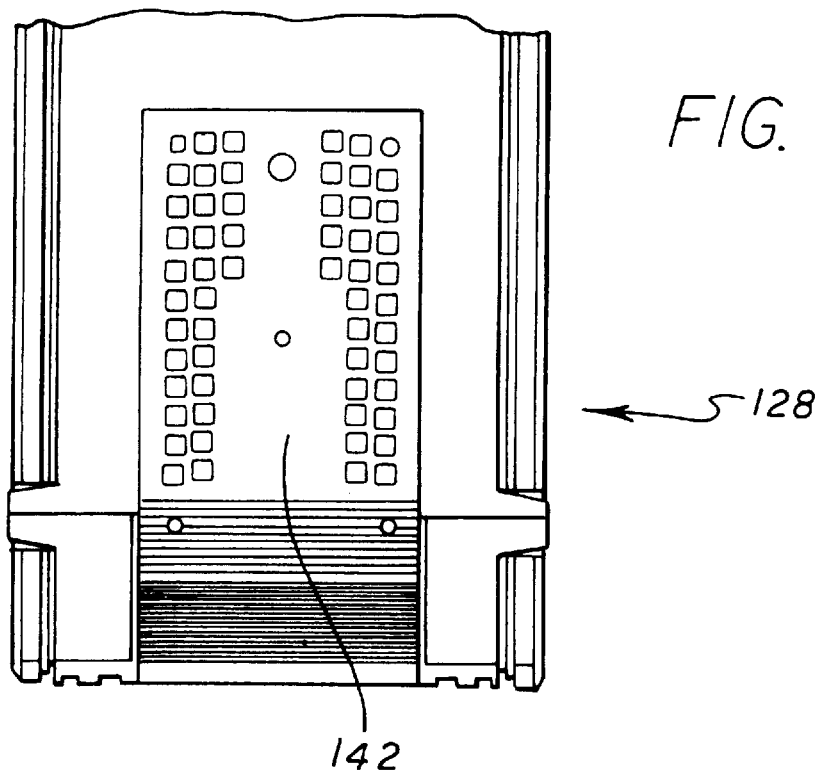
FIG. 13 is an enlarged elevation, analogous to a segment of FIG. 6, but representing the FIG. 11 pen portion which carries a flex-circuit interconnect.
Figure 14:
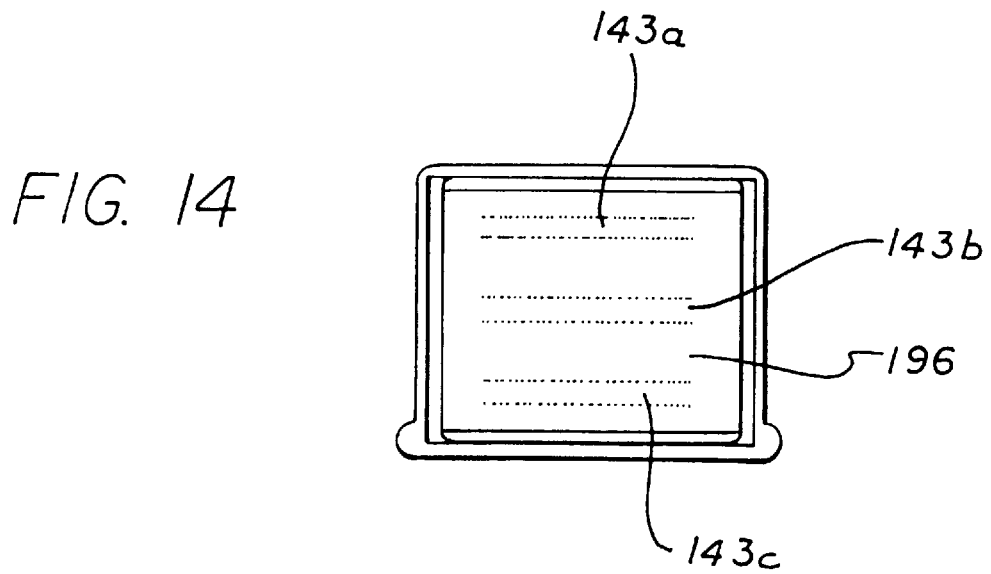
FIG. 14 is a greatly enlarged bottom plan of the FIG. 12 nozzle arrays.
Figure 15:
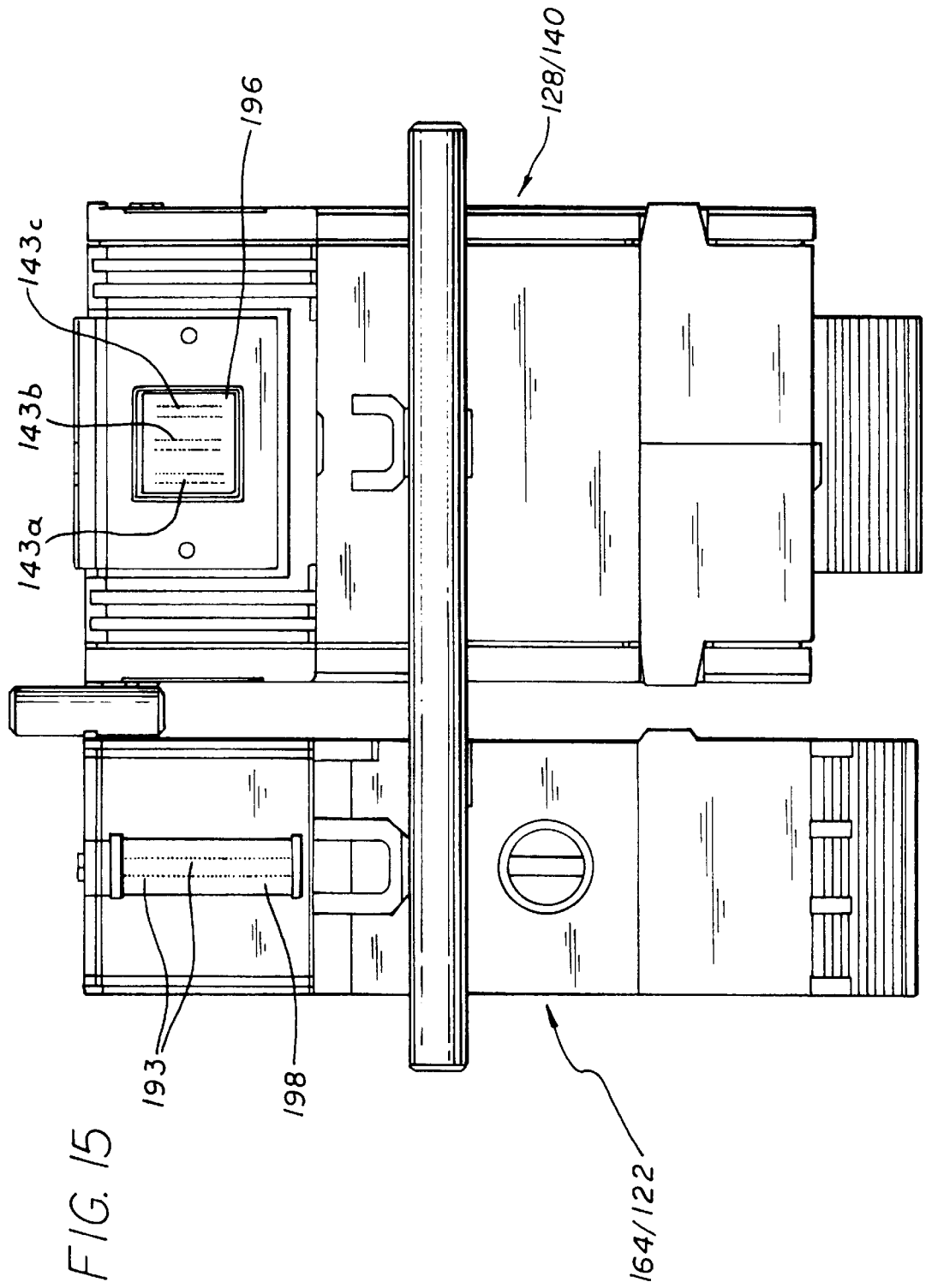
FIG. 15 is a like bottom plan, but somewhat less greatly enlarged, of the two pens in the FIG. 10 printer.

This pen body also has not one but three arrays 143a, 143b, 143c of ink-ejecting nozzles (FIGS. 12, 14 and 15). Each array is a double column having thirty-two nozzles in each column, for a total of sixty-four in each array and one hundred ninety-two overall.

Figure 17:
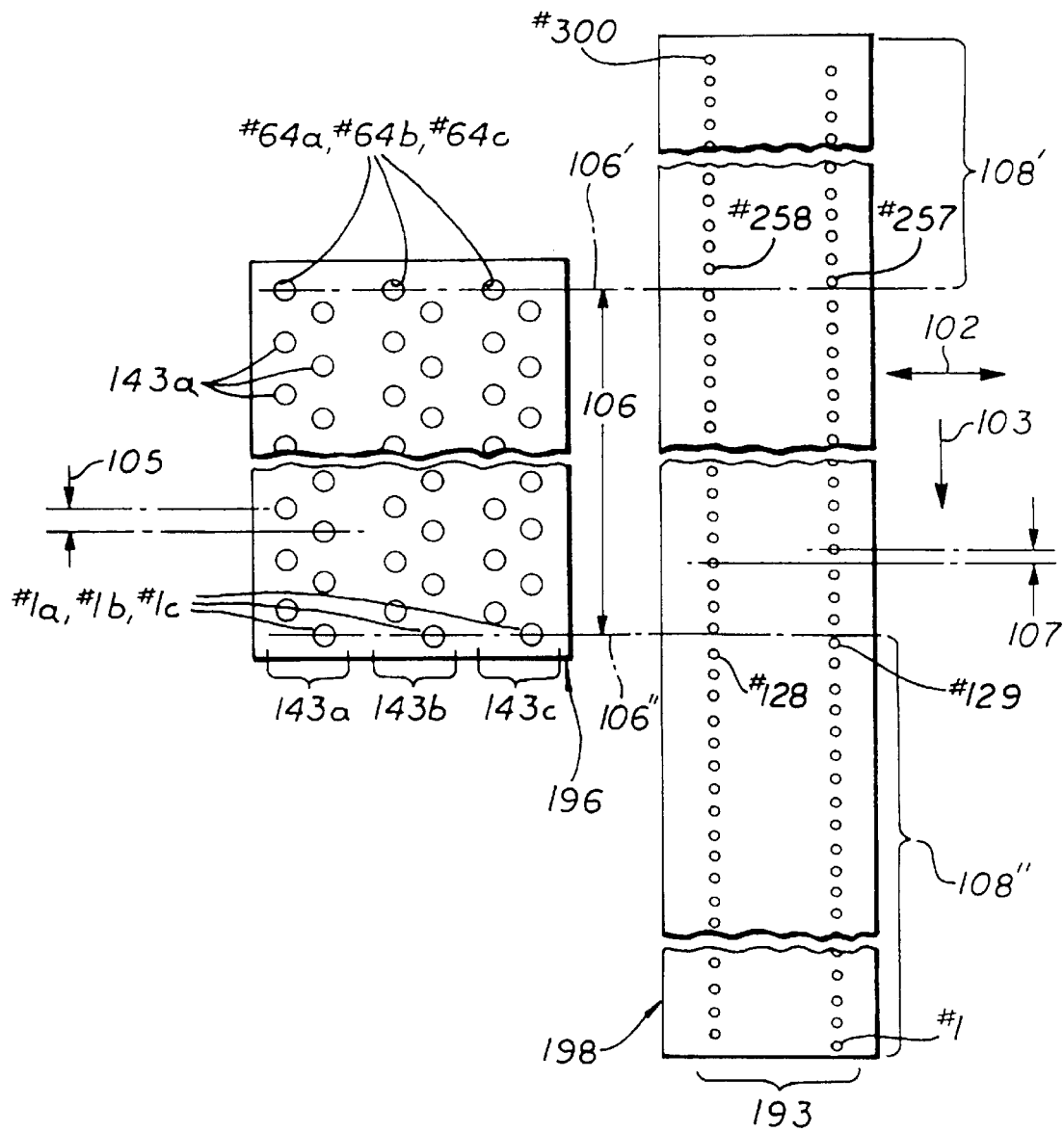
FIG. 17—analogous to FIG. 8—is a very greatly enlarged top plan of the nozzle plates in the FIG. 16 view, but drawn close together for easier comparison.

The color-ink nozzles are defined in an orifice plate or nozzle plate 196, oriented parallel to and facing the printing medium 114'. FIG. 17 shows this nozzle plate 196 and the plate 198 of the other pen 122, together—not as they would normally appear from below, but rather in mirror image, or as seen through the tops of the cartridges 122, 128 looking toward the print medium 114'.

Figure 16:
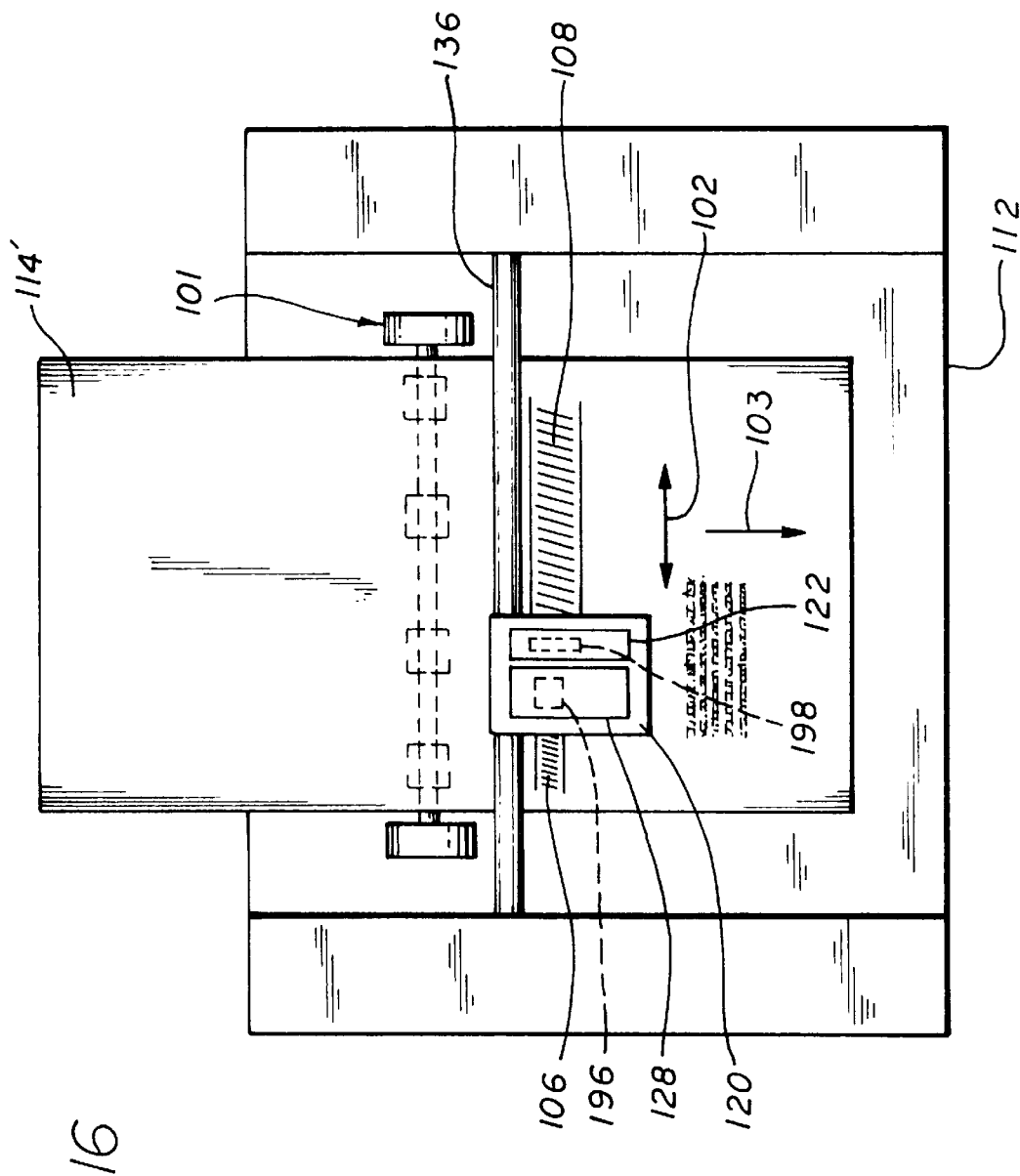
FIG. 16 is a top plan of portions of the FIG. 10 printer and particularly showing in the phantom line how the footprints of the two FIG. 15 pens are disposed together in relation to a sheet of printing medium.

For orientation purposes a like point of view is assumed in FIG. 16, which is greatly reduced relative to FIG. 17. FIG. 16 also shows ink swaths 106, 108 produced on the medium 114' by the two pens 128, 198 respectively.

Figure 10:
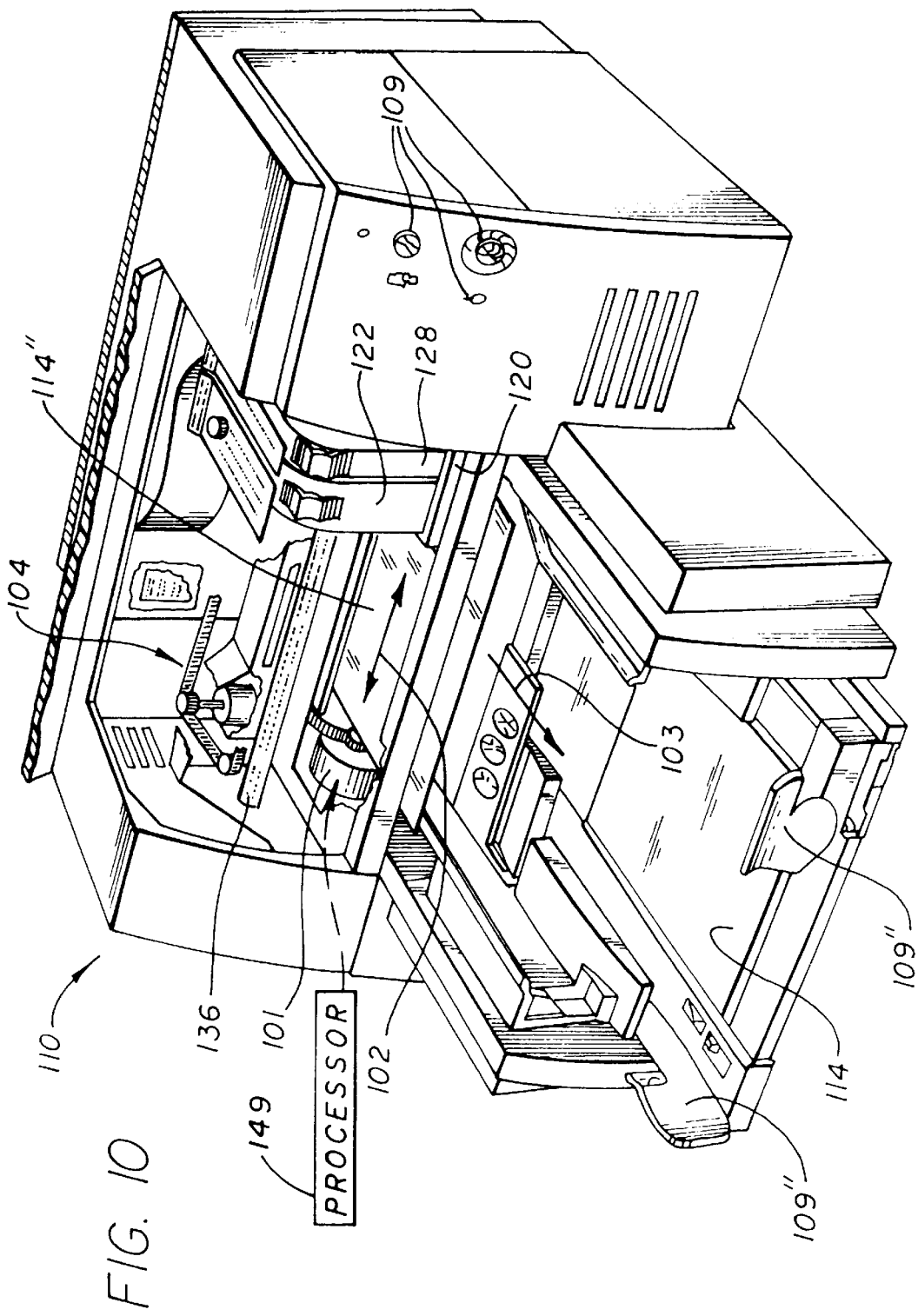
FIG. 10 is a view like FIG. 1, but of a second printing environment—another representative inkjet printer in which the present invention can be incorporated—drawn with the cover and certain other components broken away.
Figure 11:
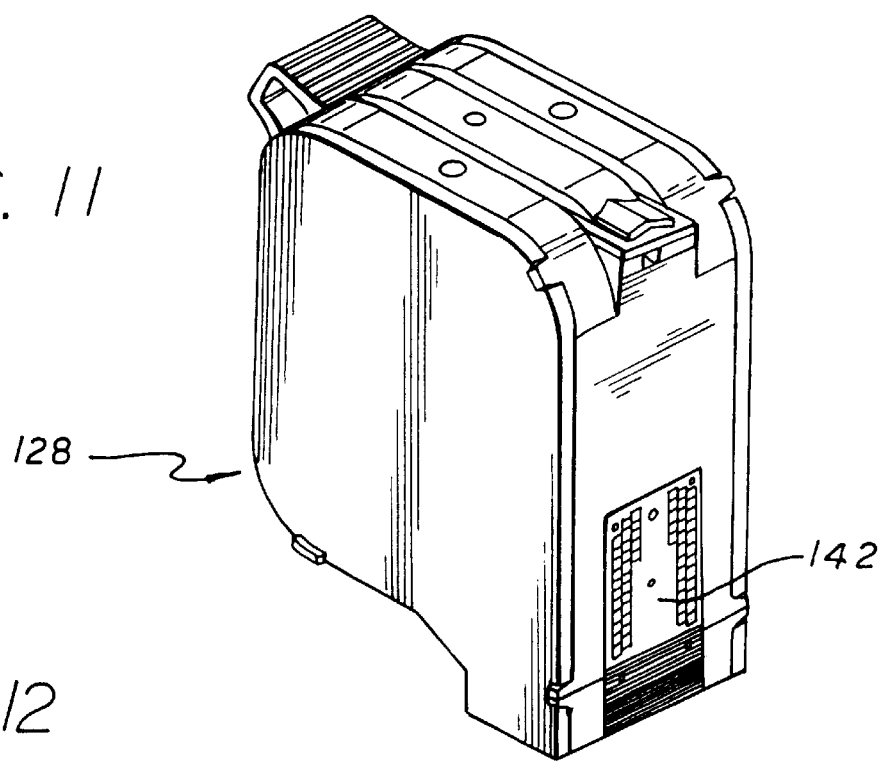
FIG. 11 is a view like FIG. 3, but of a so-called "trichamber" pen, a different type of pen or print cartridge that has within a single pen body reservoirs for ink of three different colors, and corresponding sets of ink-ejection nozzles for printing in those three colors, and particularly for use in the FIG. 10 printer.

In addition FIGS. 10 and 16 show portions 101 of the drive mechanism that advances the printing medium 114, 114' along an advance direction 103. These elements 101 are representative as well of medium-advance drive components (not shown) in the other two printing environments discussed in this document. The print-medium advance drive mechanism is controlled by the same programmed microprocessor 149 (FIG. 10) which controls the pens.

Figure 7:
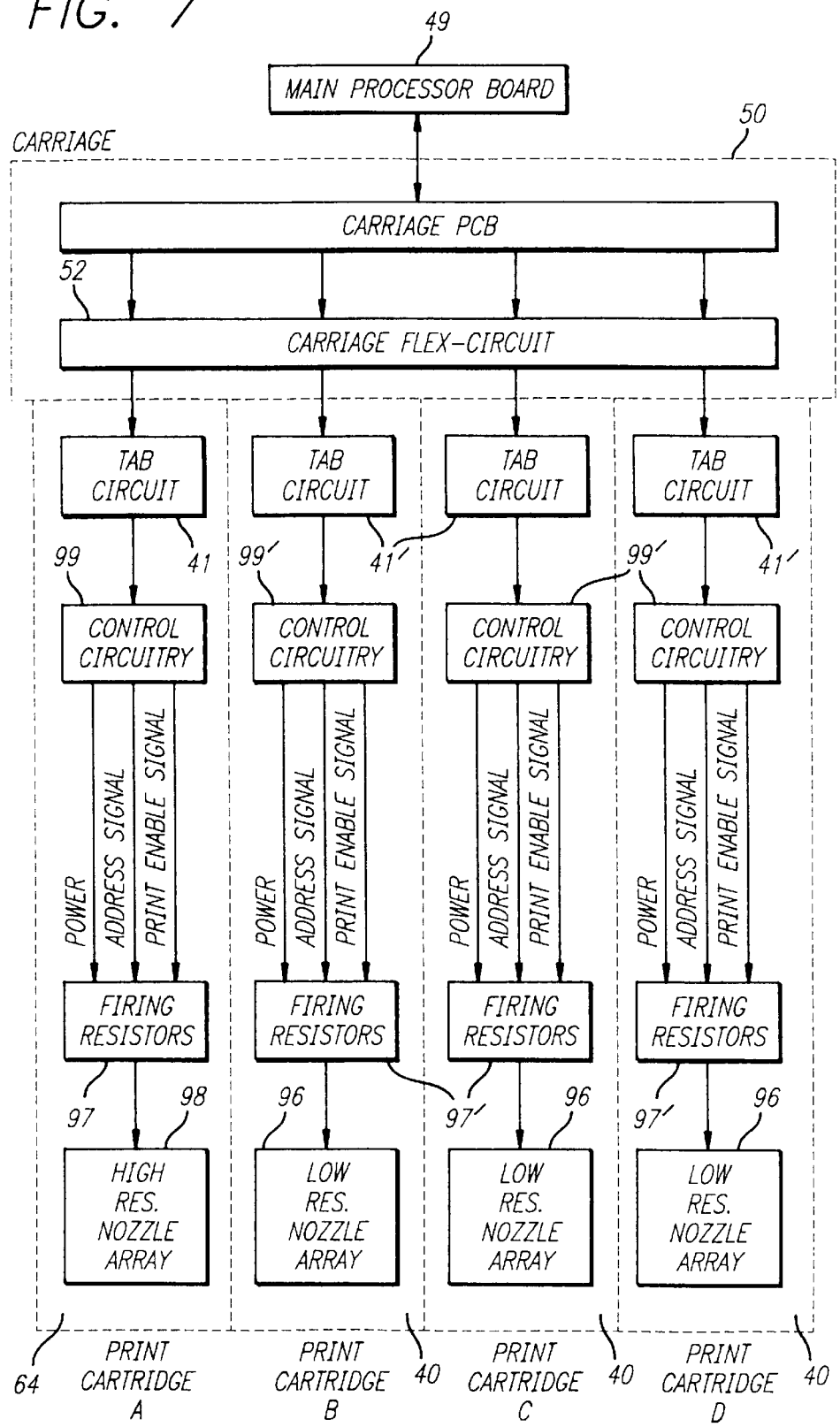
FIG. 7 is a schematic block diagram of electronics for the system of FIGS. 1 through 6.

Within the pen body 126, each of the three double-column arrays 143a–c is connected—through individual nozzle firing devices (not illustrated, but the electronic portions of which are analogous to resistors 97' in FIG. 7)—to a respective reservoir (not shown) of differently colored ink, so that in operation the nozzles of each array when actuated emit a different color of ink (typically yellow, magenta and cyan respectively). The arrays are mutually parallel, and parallel to the direction of print-medium advance—i.e., the swath-height direction.

In each color array, adjacent nozzles are alternately offset to form a zigzag pattern, providing the benefit of close nozzle spacing along the swath-height direction without physical interference between adjacent nozzles. Thus the odd-numbered nozzles of each array are in one column while the even-numbered nozzles of the same array are in a second, parallel column.

In a preferred embodiment, the spacing between these columns of like-color nozzles is 2/3 mm (0.027 inch), and the color arrays are spaced apart from each other by 2½ mm (0.1 inch). Control software times the output of the nozzles to compensate for their different lateral positions.

The nozzle pitch of each color array—i.e., the reciprocal of the nozzle spacing 105 (FIG. 17)—is 11.8 nozzles/mm (300 nozzles/inch). Dividing into sixty-four, the number of nozzles in each array, the total length of each array is thus 5.4 mm (0.21 inch).

The black-ink printhead 128 is substantially identical to that 98 described above for the printer of FIGS. 1 through 9. The black-ink nozzle array 193 is also arranged in two columns of alternating nozzles, in this case spaced about 4.1 mm (0.16 inch) apart. Here the nozzle pitch—the reciprocal of the nozzle spacing 107, FIG. 17—is 23.6 nozzles/mm (600 nozzles/inch).

In all plural-pen systems, accurate mutual positioning of the two or more nozzle plates is important. The mechanical registration points or so called "datum" surfaces are carefully arranged to ensure precise alignment. The even-numbered nozzle centers of the black-ink pen are centered along a line positioned to the right of the even-numbered nozzle centers of the rightmost color set by about 7.4 mm (0.29 inch).

In this system, unlike the first printing environment discussed earlier, the black-ink pen is disposed asymmetrically with respect to the color-ink pen (FIG. 17). Of the three hundred black-ink nozzles 193, one hundred twenty-nine nozzles 108" (nozzles #1 through #129) extend beyond the color-ink nozzles in the direction 103 of print-medium advance; but only forty-five nozzles 108' (#256 through #300) in the opposite direction.

Such asymmetry can be used for various purposes, as for example to help control adverse interactions between different inks, or between inks and the printing medium—as set forth in the contemporaneously filed applications, previously enumerated, of Mark Stephen Hickman.

Neglecting nozzle diameter, the color swaths 106 extend from upper color limit 106' to lower color limit 106" employing color nozzles #1a–c through #64a–c; and this color swath encompasses one hundred twenty-six black-ink nozzles #130 through #255.

3. A Third Preferred Printing Environment

Figure 18:
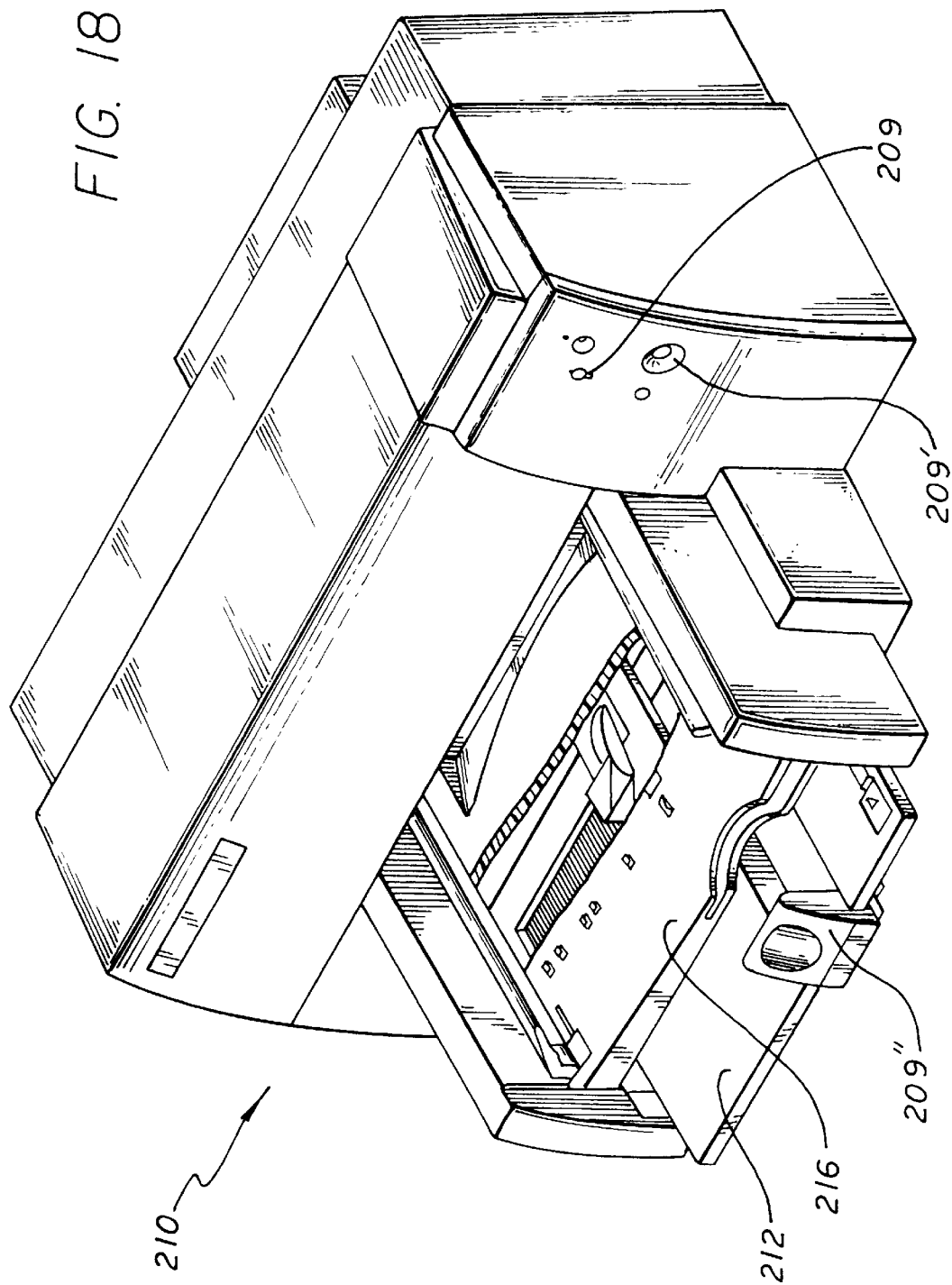
FIG. 18 is a view analogous to FIGS. 1 and 10, but showing still a third printing environment—a third representative inkjet printer in which the present invention is advantageously incorporated—and showing the cover closed.
Figure 19:
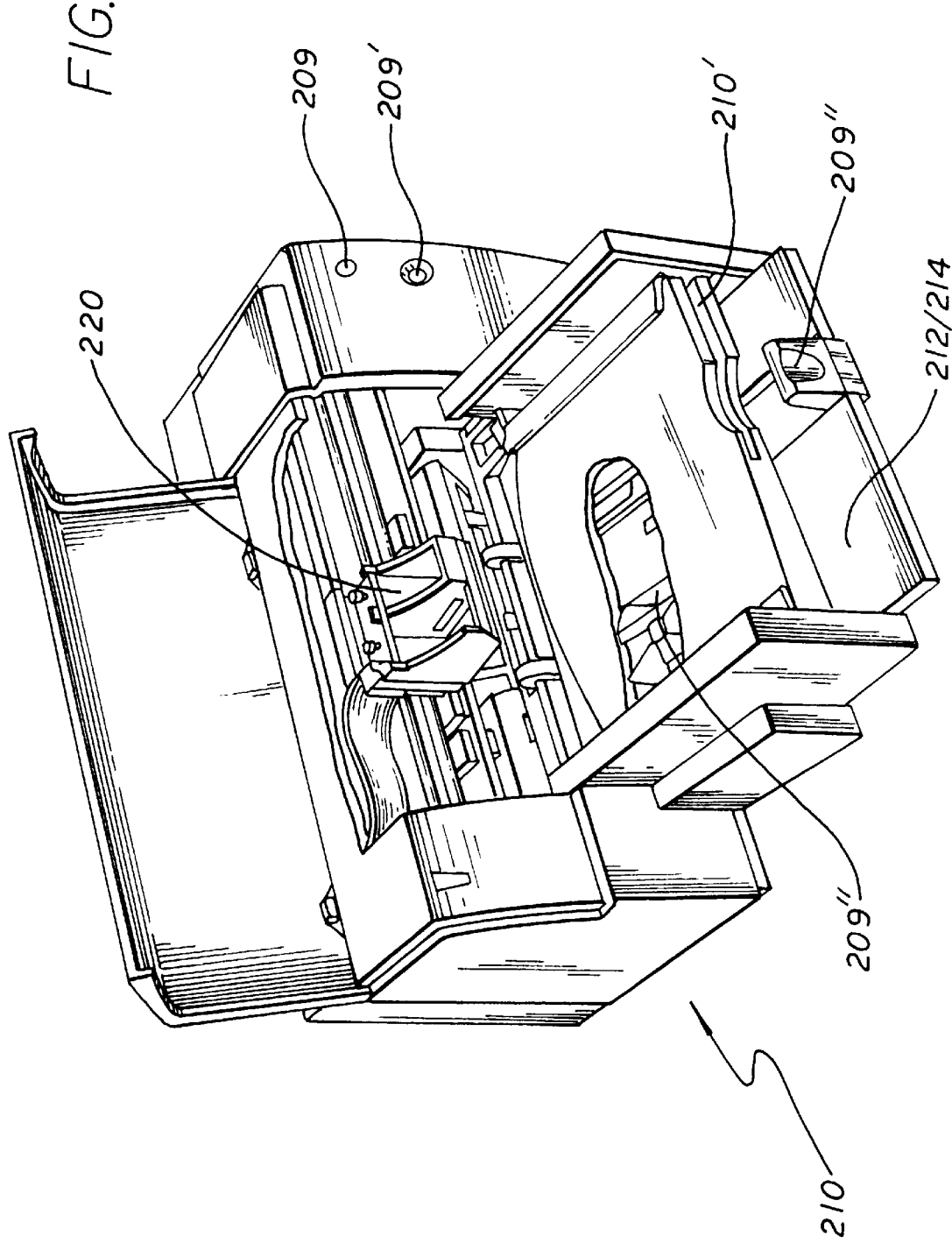
FIG. 19 is a view of the FIG. 18 printer but with the cover open.

As in the two cases already discussed, like reference numerals are used for corresponding features in this third case—but with a prefix "2". Thus for example the printer generally is designated 210, FIGS. 18 and 19, in correspondence with the printers 10, 110 of the earlier discussions.

This printer too has adjoining cradles in a carriage 220 (FIG. 19) for a black-ink pen represented by nozzle plate 298 (FIG. 20) and a trichamber color-ink pen represented by nozzle plate 296. Here the emphasis is on economy, as the black-ink pen 226 has only forty-eight nozzles and the color-ink pen 228 just sixteen for each color. Resulting print speed is lower.

The color-ink nozzle arrays 243a, 243b, 243c of this trichamber pen are staggered, with one array 243b (typically for magenta) offset to the right of the other two (typically for yellow and cyan). Nozzle spacing 205/207 in the black-ink and color-ink arrays is the same, 0.085 mm (1/300 inch), yielding coarser resolution for black than in the previously discussed systems.

The height 206 of each color-ink array 243a–c is thus about one-third the height 208 of the black-ink array. About 0.4 mm (1/60 inch) added clearance 74, 75 is provided between the color-ink arrays, in the swath-height direction, making the overall combined height of the three staggered color-ink nozzle arrays just slightly (0.8 mm or 1/30 inch) greater than the height of the black-ink array.

Figure 20:
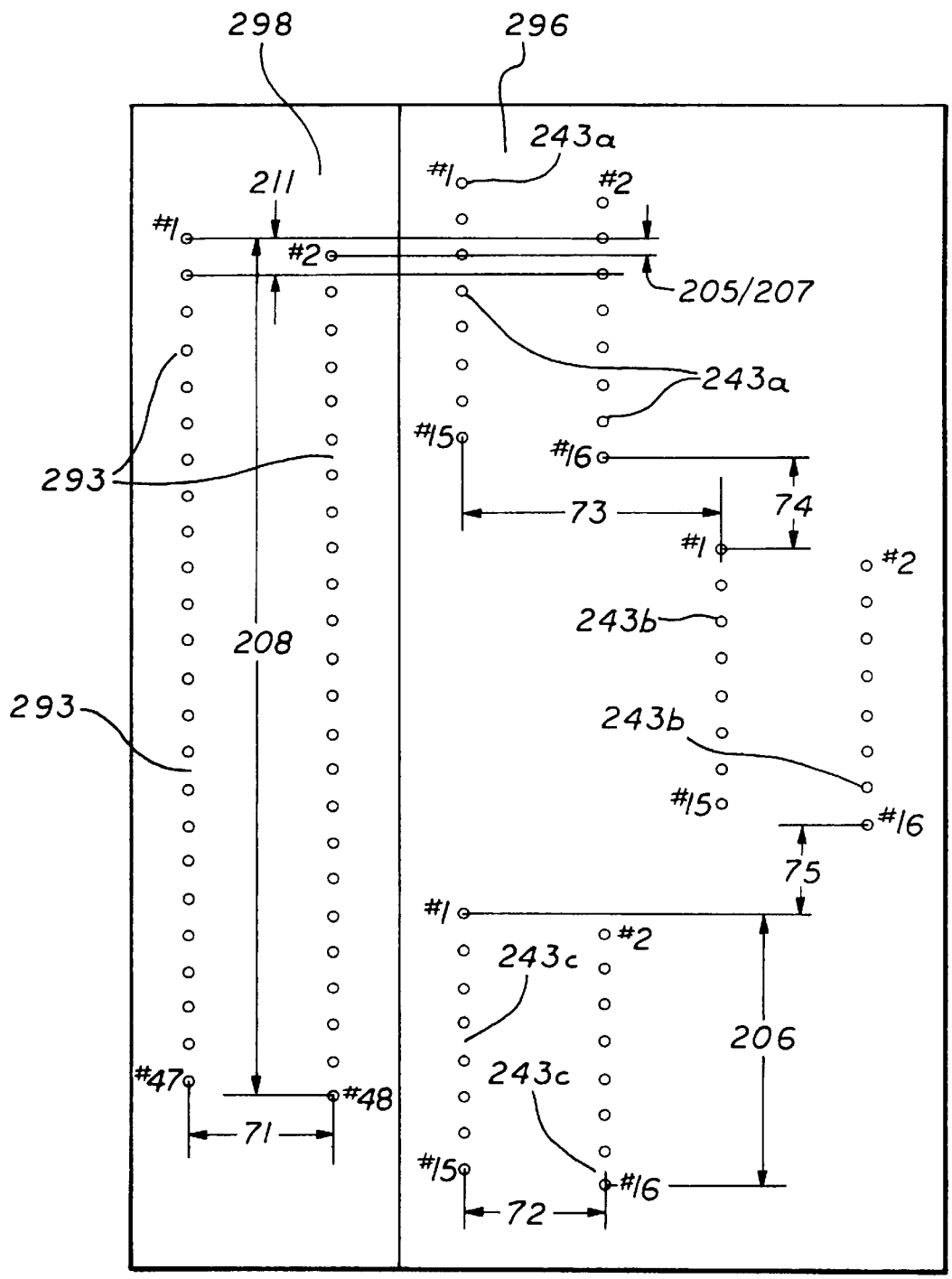
FIG. 20 is a view, analogous to FIGS. 8 and 17, of nozzle arrays for two pens of the FIG. 18 printer—particularly including one trichamber pen with staggered nozzle arrays for three ink colors respectively, and one black-ink pen.

In this system the black-ink pen is disposed almost symmetrically with respect to the color-ink pen (FIG. 20). Three color-ink nozzles (#1 through #3 of the topmost array 243a) extend above the black-ink nozzle array 293, and five nozzles (#12 through #16 of the bottom-most array 243c) below—for an asymmetry amounting to two nozzle-spacing distances or just 1/6 mm (1/150 inch).

Due to the staggered-array configuration, this trichamber nozzle plate 296 and its corresponding pen can be narrower than the trichamber pen 196 of FIGS. 11 through 17. Each of the three double-column arrays 243a–c (FIG. 20) has a zigzag pattern and is connected within the pen body 226, through individual nozzle firing systems (not shown but see 97' in FIG. 7), to a respective reservoir (not shown) of differently colored ink, as in the system discussed previously.

In a preferred embodiment, the spacing 72 between individual nozzle columns is 2/3 mm (0.027 inch), as in the previous case. Here the color arrays are mutually offset by a distance 73 of about 1½ mm (0.06 inch).

With forty-eight nozzles at 11.8 nozzles/mm (300 nozzles/inch), the black-ink array is nominally 4.1 mm (0.16 inch) tall. The overall color-ink array is eight nozzle spacings taller, totaling about 4.8 mm (0.19 inch).

The black-ink nozzle array 293 too is arranged in two columns of alternating nozzles, in this case spaced apart by a distance 71 of about 0.85 mm (1/30 inch). In both pens the separation 211 between adjacent nozzles within each nozzle column is twice the effective nozzle spacing, or pixel spacing, 205/207.

4. Different Pixel Densities in an Extended Printzone

By "extended printzone" is meant a swath height 8, 108, 208 that is available using a first array 93, 193, 293 of colorant-dispensing devices—and that is greater than a swath height 6, 106, 206 available in concurrent printing using a second array 43a–c, 143a–c, 243a–c of colorant-dispensing devices.

In all three printing environments described above, the "first array" is the array of black-ink-dispensing inkjet nozzles 93, 193, 293. The "second array" is any one of the three arrays of single-color-dispensing inkjet nozzles 43a–c, 143a–c, 243a–c.

The taller swath height 8, 108, 208 allows any given amount of ink to be spread over a taller area. For example, if for some particular image it is desired to print equal amounts of yellow and black ink, the taller black-ink pen can distribute black ink over a taller area than the yellow-ink pen—while the printing-medium 14', 114' advances in keeping with the print rate of the shallower, yellow-ink pen.

More generally in printing with all colors the taller head distributes ink over a taller area while the print-medium advance keeps pace with the shallower head. This allows the taller printhead to put down ink at a slower rate, during a greater number of passes—while still producing the same amount of total coverage, after all the passes are complete, as the shallower heads.

For instance suppose that the taller nozzle array A (FIG. 21), which discharges a corresponding color A, has a height 8 of three units; and the shallower array B, discharging color B, has a height 6 of two units. The taller array A can use three passes to coat color A over an area with a swath advance of one unit, while the shallower array B puts down the same amount of ink of color B in two passes.

Figure 21:
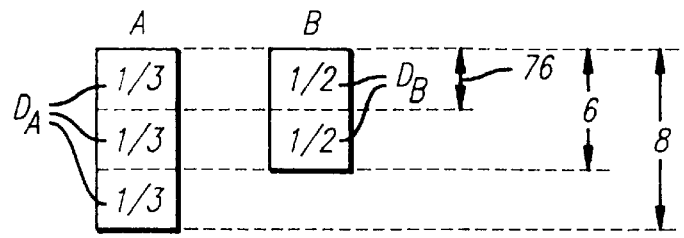
FIG. 21 is a highly schematic diagram of first exemplary relations between swath heights and printing-medium advance according to the invention, and particularly relating to the printer of FIGS. 1 through 9.
Figure 22:
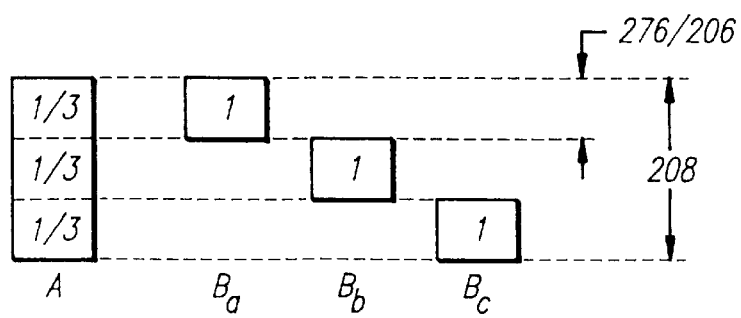
FIG. 22 is a like diagram but particularly relating to the printer of FIGS. 18 through 20.
Figure 23:
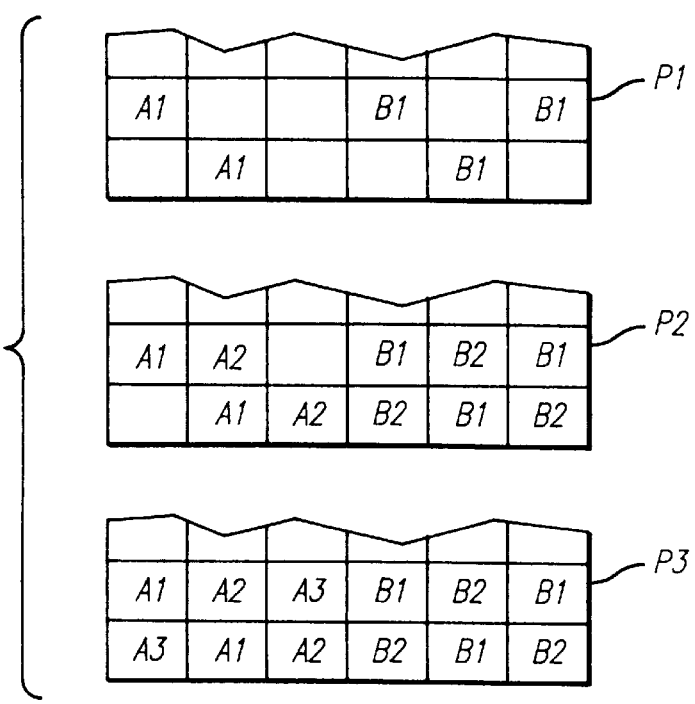
FIG. 23 is a highly schematic diagram of an exemplary three-stage printmask series, showing black and color inking under print-density practices according to the invention.

FIG. 23 shows this process for color A from a three-unit-tall array A, and for color B from a two-unit-tall array B—the relationship of FIG. 21. Inking of color A in the first pass P1 is symbolized as A1, in the second pass P2 as A2 and in the third pass P3 as A3. Inking of color B in each of two passes P1, P2 is symbolized as B1 and B2 respectively.

In one of the three passes used for color A, no inking of color B occurs: here it is the third pass P3, but it could be the first P1 instead, depending e.g. on the direction in which the extended printzone is made to extend. FIG. 23 also shows that the taller pen A can ink at a lower density $D_A$ of 33% (i.e., one-third) per pass, in each of its three passes, compared with 50% density $D_B$ per pass for two passes.

This invention thus allows ink to be spread over a wider area when printing with two or more colors, to improve various print attributes such as drying time, bleed, cockle and curl of the printing medium, etc. For printing with only the extended-printzone color, however, the invention enables increases in throughput without increasing the size of all the inking arrays.

Figure 24:
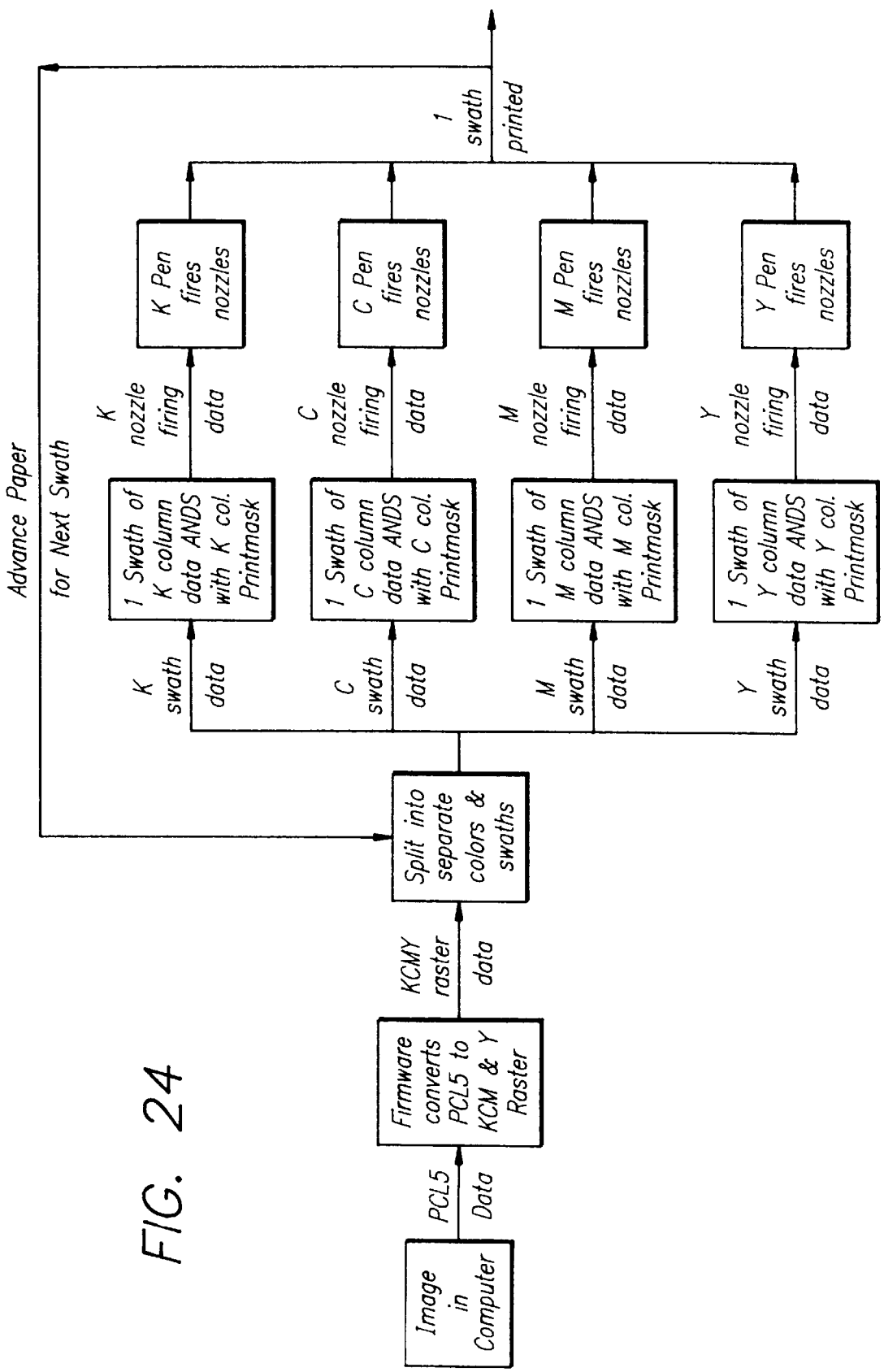
FIG. 24 is an exemplary firmware flow chart corresponding to the FIG. 23 masking scheme—and also to those of FIGS. 25 through 27.

FIG. 24 shows how the FIG. 23 masking can be implemented in firmware. Those skilled in the art will find the flow chart of FIG. 24 self explanatory.

FIG. 24 is only exemplary; those skilled in the art of programming for pixel-based printing machines will understand that many other schemes can be employed equivalently for causing a programmed microprocessor to produce the masking of FIG. 23.

5. Resolution- or Color-dependent Masking

Figure 25:
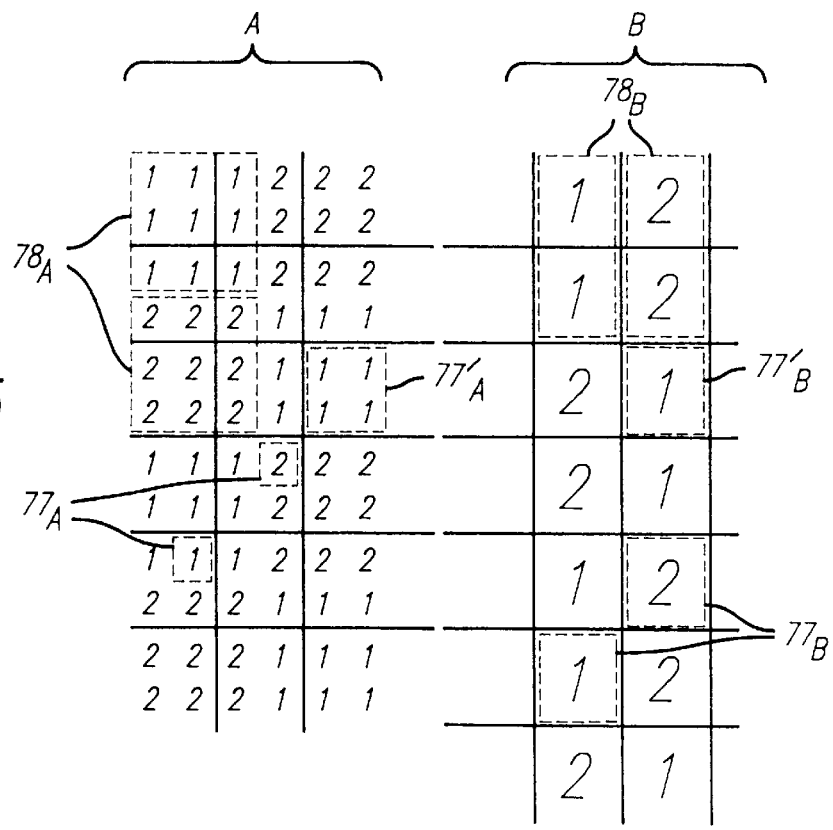
FIG. 25 is a diagram like FIG. 23 but comparing black and color inking, under resolution-controlled masking practices according to the invention.

FIG. 25 shows inking by a higher-resolution pen A at left, and a lower-resolution pen B at right. The smaller numerals at left represent finer pixels $77_A$, and in both parts of the drawing "1" and "2" represent a first and second pass respectively.

The areas covered by the two pens A, B are understood to be mutually aligned at the upper left-hand corners of the two patterns. The higher-resolution pen A, at left, has pixel cells $77_A$ half the size of the pixel cells $77_B$ for the lower-resolution pen at right.

Since the dimensions of the finer and coarser pixels $77_A$, $77_B$ stand in a ratio of two small integers (namely 1:2), they could easily be printmasked in common. That is to say, the finer pixels $77_A$ of the device A at left could be masked in two-pixel-square groups e.g. $77_A'$, and these two-pixel-square groupings $77_A'$ given exactly the same masking treatment as individual pixels $77_B$ of the coarser-pixel device B at right.

In short, wherever a pixel $77_B'$ was printed by the coarse-resolution device B at right, four pixels $77_A'$ would be printed by the fine-resolution device A at left.

The invention, however, provides different masking for the two cases. The finer-pixel device A at left is masked in clusters $78_A$ that are mismatched relative to the coarser pixels at right, instead of either an even distribution (i.e., every other pixel printed in each pass) or a distribution $77_A'$ that matches the masking $77_B'$ for the coarser-pixel device B at right.

FIG. 25 illustrates a choice of three-pixel squares $78_A$ for masking of the left-hand finer-pixel device A, and also shows two-by-one-pixel tall rectangles $78_B$ for the right-hand coarser-pixel device B. As can be seen by inspecting the diagram, the result of this combined masking pattern is relatively irregular conjunction of the two patterns $78_A$, $78_B$.

The cross-combination pattern units tend to be odd-shaped, and to repeat at different intervals in orthogonal directions. These resulting irregular patterns interact differently with dot placement errors to provide an even more erratic, or less evidently patterned, field of output colors.

FIG. 24, already mentioned above, is also applicable to show how the FIG. 25 masking may be implemented through firmware. FIG. 24 is in fact general to these systems and applies as well to the remaining embodiments of FIGS. 26 and 27 discussed below.

Figure 26:
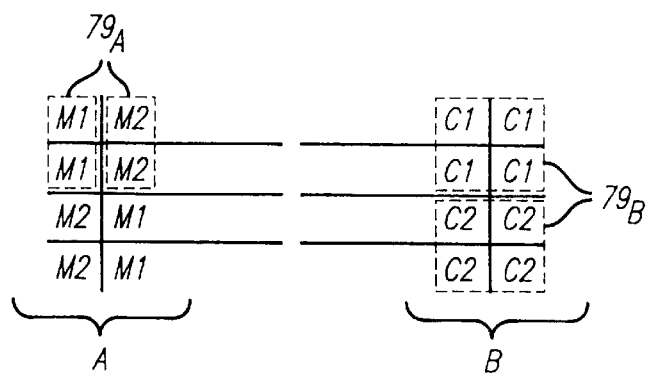
FIG. 26 is a diagram like FIGS. 23 and 25 but comparing inking for different colors, under color-controlled masking practices consistent with the invention.
Figure 27:
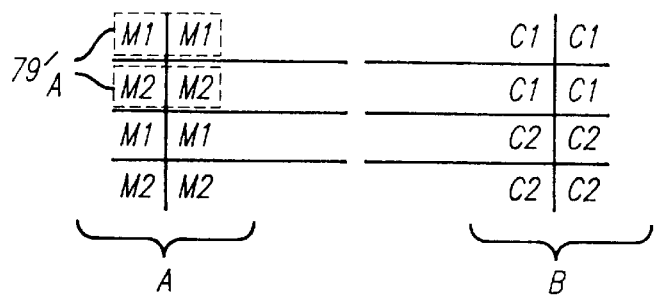
FIG. 27 is a like diagram for alternative color-controlled masking consistent with the invention.

FIG. 25 illustrates different masking for different resolutions. FIGS. 26 and 27 illustrate a related innovation: different masking for different colors.

Although the two embodiments can be combined, FIGS. 26 and 27 show common resolution for the two colors illustrated—which will be the case as between chromatic colors, in all three of the printing environments introduced above. In FIGS. 26 and 27 the prefixes "M" and "C" represent different chromatic colors (typically magenta and cyan respectively), and as before the suffixes "1" and "2" represent first and second passes respectively.

FIG. 26 shows one masking pattern (rectangles $79_A$, each two pixels tall by one pixel wide) for magenta, and another pattern (two-by-two-pixel squares $79_B$) for cyan. FIG. 27 shows what may be regarded as a converse arrangements (rectangles $79_A'$ one pixel tall by two pixels wide for magenta). A simpler example (not illustrated) is use of the bottom half of one pen and the top half of another.

While the two pens scan across the printing medium, both colors are put down at the same time but on different areas of the medium. If the colors are mixed on any given pixel, to create a secondary color, the procedure described tends to allow the first ink to dry and penetrate into the paper—before the second color is placed on top of or next to the first.

This technique enhances print quality by minimizing interactions between inks, as well as cockle, curl, bleed etc., while minimizing the need to set aside time for drying. The overall result is greater independence of printing media, and better print quality.

The exemplary patterns of FIGS. 25 through 27 have been found particularly beneficial for the first printing environment introduced above. Within this regimen as provided by the invention, some trial and error may be helpful in selecting ideal masking for a particular combination of resolutions and other pen parameters.

The above disclosure is intended as merely exemplary, and not to limit the scope of the invention—which is to be determined by reference to the appended claims.

What is claimed is:

1. A mixed-swath-height printer for forming images as an assemblage of ink dots at pixel locations on a printing medium; said printer comprising:

means for holding the print medium;

first printing means, for operating to print on the medium an image swath having a first swath height;

second printing means, for concurrently operating to print on the medium an image swath having a second swath height that is greater than the first swath height;

common supporting means for supporting the first and second printing means together, relative to the print-medium holding means;

means for controlling the first printing means to apply ink to the medium by addressing the pixel locations at a first pixel density, wherein "pixel density" is defined as an actually-addressed fraction of a total number of addressable pixels; and means for concurrently controlling the second printing means to apply ink to the medium by addressing the pixel locations at a second pixel density that is different from the first pixel density.

2. The printer of claim 1, further comprising:

means for providing relative motion, generally parallel to said swath heights, of the medium with respect to the first and second printing means; and means for actuating the relative-motion means in conjunction with printing by said first and second printing means.

3. The printer of claim 2, wherein:

the actuating means comprise means for actuating the relative-motion means in alternation with printing by said first and second printing means.

4. A mixed-swath-height printer for forming images as an assemblage of ink dots at pixel locations on a printing medium; said printer comprising:

means for holding the print medium;

first printing means, for operating to print on the medium an image swath having a first swath height;

second printing means, for concurrently operating to print on the medium an image swath having a second swath height that is greater than the first swath height;

common supporting means for supporting the first and second printing means together, relative to the print-medium holding means;

means for controlling the first printing means to apply ink to the medium by addressing the pixel locations at a first pixel density, wherein "pixel density" is defined as an actually-addressed fraction of a total number of addressable pixels;

means for concurrently controlling the second printing means to apply ink to the medium by addressing the pixel locations at a second pixel density that is different from the first pixel density;

means for providing relative motion, generally parallel to said swath heights, of the medium with respect to the first and second printing means; and means for actuating the relative-motion means in conjunction with printing by said first and second printing means; and wherein said concurrently-controlling means comprise means for controlling the second printing means to apply ink to the medium by addressing the pixel locations at a second pixel density that is lower than the first pixel density.

5. The printer of claim 4, wherein:

said second swath height has a value; and the actuating means comprise means for actuating the relative-motion means to provide a relative shift, of the medium with respect to the first and second printing means, that is less than said second swath height value.

6. The printer of claim 5, wherein:

the actuating means comprise means for actuating the relative-motion means to provide a relative shift, of the medium with respect to the first and second printing means, that is one-third of said second swath height value.

7. The printer of claim 5, wherein:

the first swath height has a value; and the actuating means comprise means for actuating the relative-motion means to provide a relative shift, of the medium with respect to the first and second printing means, that is less than said first swath height value.

8. The printer of claim 5, wherein:

the first swath height has a value; and the actuating means comprise means for actuating the relative-motion means to provide a relative shift, of the medium with respect to the first and second printing means, that is one-half of said first swath height value.

9. The printer of claim 5, wherein:

the first swath height has a value; and the actuating means comprise means for actuating the relative-motion means to provide a relative shift, of the medium with respect to the first and second printing means, that is equal to said first swath height value.

10. The printer of claim 5, wherein:

the first swath height has a first height value;

the second swath height has a second height value;

the actuating means comprise means for actuating the relative-motion means to provide a relative shift, of the medium with respect to the first and second printing means, that is:

a first fraction of the first swath height value, and is a second fraction of the second swath height value; and each of the first and second fractions has a numerator of 1 and a denominator that is a respective integer.

11. A mixed-swath-height printer for forming images as an assemblage of ink dots at pixel locations on a printing medium; said printer comprising:

means for holding the print medium;

first printing means, for operating to print on the medium an image swath having a first swath height;

second printing means, for concurrently operating to print on the medium an image swath having a second swath height that is greater than the first swath height;

common supporting means for supporting the first and second printing means together, relative to the print-medium holding means;

means for controlling the first printing means to apply ink to the medium by addressing the pixel locations at a first pixel density;

means for concurrently controlling the second printing means to apply ink to the medium by addressing the pixel locations at a second pixel density that is different from the first pixel density;

means for providing relative motion, generally parallel to said swath heights, of the medium with respect to the first and second printing means; and means for actuating the relative-motion means in conjunction with printing by said first and second printing means; and wherein:

said concurrently-controlling means comprise means for controlling the second printing means to apply ink to the medium by addressing the pixel locations at a second pixel density that is lower than the first pixel density;

the first swath height has a first height value;

the second swath height has a second height value;

the actuating means comprise means for actuating the relative-motion means to provide a relative shift, of the medium with respect to the first and second printing means, that is less than said second swath height value;

the actuating means comprise means for actuating the relative-motion means to provide a relative shift, of the medium with respect to the first and second printing means, that is:

a first fraction of the first swath height value, and is a second fraction of the second swath height value; and the first and second fractions are ½ and ⅓ respectively.

12. The printer of claim 5, wherein:

the printing medium is effectively subdivided, for printing, into successive height segments equal to said relative shift; and on the medium, each height segment equal to said relative shift is addressed during more operations of said second printing means than of said first printing means.

13. The printer of claim 1, wherein:

the first printing means comprise plural discrete printing-means bodies;

the printer further comprises a plurality of arrays of colorant-dispensing devices, and each of said printing-means bodies carries a respective one of the arrays of colorant-dispensing devices;

the plural arrays of colorant-dispensing devices have a common dispensing-device array height substantially equal to the first swath height;

the second printing means comprise at least one array of colorant-dispensing devices having a dispensing-device array height substantially equal to the second swath height; and the common supporting means comprise a common carriage which carries the first and second printing means in common for scanning together across the medium.

14. The printer of claim 13, wherein:

said plural printing-means bodies comprise three discrete pens.

15. The printer of claim 14:

further comprising a plurality of chromatic-colorant inks; and wherein each of the plural pens carries a different chromatic-colorant ink respectively.

16. The printer of claim 13:

further comprising black ink; and wherein the second printing means comprise a pen carrying black ink.

17. The printer of claim 1, wherein:

the first printing means comprise plural colorant-supply chambers and plural arrays of colorant-dispensing devices, in a common printing-means body;

the plural arrays of colorant-dispensing devices are respectively associated with the plural colorant-supply chambers;

said plural arrays of colorant-dispensing devices, have a common array height substantially equal to the first swath height;

the second printing means comprise at least one array of colorant dispensing devices, with an array height substantially equal to the second swath height;

the common supporting means comprise a common carriage which carries the first and second printing means in common for scanning together across the medium.

18. The printer of claim 17:

further comprising plural chromatic colorants; and wherein each of the plural colorant-supply chambers carries a different chromatic colorant respectively.

19. A method of forming images as an assemblage of ink dots at pixel locations on a printing medium; said method comprising the steps of:

printing on the medium an image swath having a first swath height;

concurrently printing on the medium an image swath having a second swath height that is greater than the first swath height;

controlling the first-swath-height printing step to apply ink to the medium by addressing the pixel locations at a first pixel density, wherein "pixel density" is defined as an actually-addressed fraction of a total number of addressable pixels; and concurrently controlling the second-swath-height printing step to apply ink to the medium by addressing the pixel locations at a second pixel density that is different from the first pixel density.

20. The method of claim 19, for printing in plural colorants, and wherein:

the second pixel density is lower than the first pixel density;

said printing and concurrently-printing steps comprise addressing to each pixel, for each colorant, an inking level selected from the group consisting of:

binary color, in which each pixel either receives or does not receive one specific number of dots for each colorant respectively; and plural-bit color, in which each pixel receives a number of dots, for each colorant respectively, which can vary between zero and $2^n-1$ times a specific number of dots for each colorant, where $n \geq 2$ is a number of bits characterizing said plural-bit color.

* * * * *